(12) United States Patent
Denniston, Jr.

(10) Patent No.: US 8,702,010 B2
(45) Date of Patent: Apr. 22, 2014

(54) METHOD AND SYSTEM FOR ENCODING AND DECODING DATA

(75) Inventor: William B. Denniston, Jr., Lake Forest, IL (US)

(73) Assignee: SD-X Interactive, Inc., Lincolnwood, IL (US)

(*) Notice: Subject to any disclaimer, the term of this patent is extended or adjusted under 35 U.S.C. 154(b) by 0 days.

(21) Appl. No.: 13/609,016

(22) Filed: Sep. 10, 2012

(65) Prior Publication Data

US 2013/0001313 A1 Jan. 3, 2013

Related U.S. Application Data

(63) Continuation of application No. 12/770,424, filed on Apr. 29, 2010, now Pat. No. 8,262,000.

(51) Int. Cl.
*G06K 7/00* (2006.01)
*G06K 7/10* (2006.01)
*G06K 19/00* (2006.01)
*G06K 19/06* (2006.01)

(52) U.S. Cl.
USPC ...... 235/494; 235/435; 235/462.01; 235/487; 235/472.01

(58) Field of Classification Search
USPC .............................. 235/435, 462.01, 487, 494
See application file for complete search history.

(56) References Cited

U.S. PATENT DOCUMENTS

| | | | |
|---|---|---|---|
| 2005/0139677 A1* | 6/2005 | Tan et al. | 235/462.36 |
| 2007/0018002 A1* | 1/2007 | Lapstun et al. | 235/487 |
| 2008/0093468 A1* | 4/2008 | Fan et al. | 235/494 |

* cited by examiner

*Primary Examiner* — Michael G Lee
*Assistant Examiner* — Laura Gudorf
(74) *Attorney, Agent, or Firm* — Loeb & Loeb LLP

(57) ABSTRACT

Disclosed is a processing system and method, the system including a code physically associated with a source. The code includes one or more patterns including a guide pattern arranged in a mark, wherein each pattern includes one or more pattern elements arranged in pattern element zones. Each of the respective pattern has a pattern signature based on a predetermined physical attribute corresponding to the one or more pattern elements within the respective pattern. The system further includes a detection device configured to capture the mark, and a controller coupled to the detection device configured to generate physical attribute data associated with the captured mark, receive the physical attribute data, and determine the pattern signatures by performing an arithmetic calculation on the physical attribute data.

17 Claims, 17 Drawing Sheets

$$m_n = \frac{\Delta Y}{\Delta X}$$

Pattern 1    Pattern 2 (Pattern 1 Rotated 90°)

Pattern 1    Pattern 2

METHOD AND SYSTEM FOR ENCODING AND DECODING DATA

This application is a continuation of U.S. patent application Ser. No. 12/770,424, entitled "Method and System for Encoding and Decoding Data," filed on Apr. 29, 2010, allowed, which application is incorporated by reference in its entirety.

FIELD OF THE INVENTION

This invention relates to a method and system for encoding and decoding data. More particularly, the invention relates to a method and system for encoding and decoding data that uses a novel, flexible coding architecture where data is configured using a plurality of patterns in any of two, three or four dimensions, and a variable payload is associated with each pattern based on any one of a number of calculated signature values corresponding to each such pattern.

BACKGROUND

A number of optical identification systems have been created to encode and decode digital data based on the image capture of a visible two-dimensional mark printed on the surface of a medium, such as a paper document. Such systems and their corresponding methods generally encode data in the image of the mark, which mark is detected by optical means and decoded back into the original data. Bar codes are examples of such visible two-dimensional marking systems. However, of particular recent interest are several examples of two dimensional graphical indices used in publishing applications.

In these prior art systems, the graphical indices (also referred to as "graphical indicators" or "marks") are made up of a plurality of individual visual elements. These visual elements are variously referred to as "picture elements," "optical indexes," or simply "dots." Visual elements in prior art systems are generally defined to have uniform attributes, including size and shape. Moreover, the structure of a mark is often configured in a grid arrangement with an explicit (or implicit) and fixed Cartesian axis, or in an isotropic arrangement with express arrangements and relative position of visual elements within the individual marks. Data is encoded in the mark by the presence, absence or relative positions of individual visual elements within the individual mark's grid or isotropic arrangement. Thus a single encoded mark appears visually as a pattern of dots.

For example, U.S. Pat. No. 7,328,845 (referred to as the '845 patent), discloses a system where each graphical index includes a plurality of state zones. Each of the state zones may be blank or may include a micro-unit (such as a dot), where a blank state zone represents a binary "0" and a state zone having a micro-unit represents a binary "1" value. In the '845 Patent, each individual graphical index represents an indicator information, and the indicator information corresponds to an additional information. In the '845 patent, the indicator information is determined by the binary value graphically represented by the micro-units in the graphical index. Example embodiments of graphical indices as taught by the '845 patent are shown in FIGS. 1a and 1b. As also shown in FIGS. 1a and 1b, each of the graphical indices in a given area includes an identical header (111) intended to provide orientation information so that the optical reader can decode the graphical index irrespective of the orientation of the optical reader, vis-à-vis the encoded surface. In another example, FIG. 1c illustrates an isotropic graphical index as disclosed in U.S. Pat. No. 7,350,718 (referred to as the '718 patent). Similar to the '845 patent, values associated with the isotropic graphical indices in the '718 patent are determined by the binary values graphically represented by the micro-units in the index.

The existing systems have little flexibility, and convey in a single mark only a fixed and relatively small amount of data, or "payload" information. The "payload" information is typically expressed as the number of digital bits that can be obtained by decoding a single mark, and current known systems convey a payload of only 16 to 62 bits. The payload capacity of existing marking systems is fixed and not inherently variable or scalable to suit a particular application. Further, codes using many prior art systems are generally easily decoded by third parties, and thus provide little to no security for the encoded data.

The invention seeks to advance the art by addressing these and other drawbacks of the prior art. In particular, the invention seeks to provide a coding architecture having greater flexibility over a wide range of applications, and with the ability to encode larger amounts of data than previously provided for with existing systems. The inventor further seeks to provide a coding architecture for encoding and decoding digital data embedded in or on the surface of a medium with means of encrypting the encoded data to minimize the potential for unwanted decoding by users or third parties.

BRIEF DESCRIPTION OF THE INVENTION

A processing system is described herein comprising a code physically associated with a source, the code comprising one or more patterns including a guide pattern arranged in a mark, wherein each pattern includes one or more pattern elements arranged in pattern element zones. Each respective pattern of the one or more patterns having a pattern signature based on a predetermined physical attribute corresponding to the one or more pattern elements within the respective pattern. The system further includes a detection device configured to capture the mark, and a controller coupled to the detection device configured to generate physical attribute data associated with the captured mark, receive the physical attribute data, and determine the pattern signatures by performing an arithmetic calculation on the physical attribute data.

In the processing system disclosed herein, the controller may configured to generate the physical attribute data based on a geometric trait. In various embodiments, the geometric trait may be, for example, a distance between pattern elements, an area of pattern elements, a circumference of pattern elements, or a volume of pattern elements. In addition, the arithmetic calculation used to determine the signature may be, for example, a sum of certain selected physical attribute data, a product of certain selected physical attribute data, or a combination thereof In accordance with the invention, the mark has a mark payload based on a predetermined assembly of each of the unique data payloads for each pattern within the mark. The individual pattern data payloads may be assembled sequentially, or in some other predetermined manner.

In some embodiments of the invention, one or more patterns used in an application may have isometric equivalent patterns, wherein the isometric equivalent patterns are visually distinct from each other, while their pattern signatures are equal. In addition, an application of the invention may be designed so as to have multiple guide patterns, each of which is identified by a predetermined guide pattern feature, such as for example, a predetermined distance between two pattern elements (e.g., the shortest distance between two pattern elements), a predetermined area of a pattern element (e.g., the smallest area), a predetermined volume of a pattern element, a predetermined diameter of a pattern element, or a predetermined circumference of a pattern element. In one implementation, the predetermined assembly of individual pattern payloads to arrive at the mark payload may be selected from a plurality of predetermined assemblies based on the guide pattern signature corresponding to the particular guide pattern used in the corresponding mark.

The source associated with the code may be, for example, paper medium, an audio signal source, and a light source. The corresponding code will therefore be appropriate relative to the source. For example, for a paper medium, the code may be a printed code on a paper medium, and the detection device may be optical reader having an optical sensor.

Various design aspects of the detection device and controller will depend upon the source associated with the code, as well as the particulars of encoding and applications selected. For instance, where the source is a paper medium, the detection device may be an optical reader disposed in a hand-held housing shaped like an ink pen. The controller may also be disposed within the hand-held housing, however, it is contemplated that controller may be disposed in another device that is operably coupled to the detection device with a wired or a wireless link.

Also disclosed is a method of decoding a code associated with a source, the code comprising one or more patterns including a guide pattern arranged in a mark, wherein each pattern includes one or more pattern elements arranged in pattern element zones, and each respective pattern of the one or more patterns has a pattern signature based on a predetermined physical attribute corresponding to the one or more pattern elements within the respective pattern. The method further includes detecting the mark using a detection device, generating the physical attribute data associated with the captured mark, receiving the physical attribute data at a controller, and performing an arithmetic calculation on the physical attribute data to determine the pattern signatures.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 7A illustrates that a pattern element may be identified by its altitude above a surface. As illustrated in FIG. 7B, a pattern element may be identified by the amplitude of a corresponding signal frequency. As illustrated in FIG. 7C, pattern elements may be identified by a rate of change (over time or distance) of a corresponding attribute.

DETAILED DESCRIPTION OF THE INVENTION

While the present disclosure may be embodied in many different forms, the drawings and discussion are presented with the understanding that the present disclosure is an exemplification of the principles of one or more inventions and is not intended to limit any one of the inventions to the embodiments illustrated.

Figure 2:
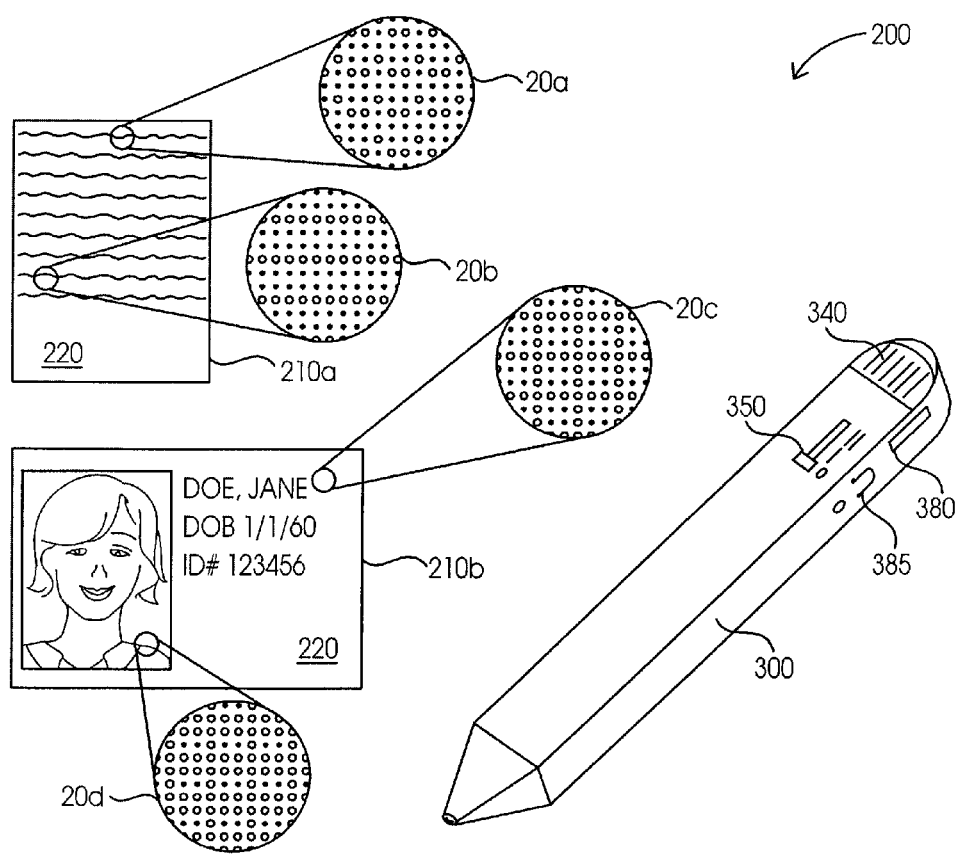
FIG. 2 illustrates one implementation of a system in accordance with the described invention.

FIG. 2 illustrates a system 200 including a code 20 physically associated with a source, medium or substrate 220 (such as printed code 20a and 20b on printed matter 210a) and a detection device 300 for detecting a predetermined feature or attribute of the code 20 (which may be, for example, in the form of a hand-held optical reader device like that show in FIG. 2). The source, medium or substrate 220 with which the code 20 is physically associated may be collectively or individually referred to generally as a "source." For purposes of explanation, the specification will primarily speak in terms of a hand-held optical reader device for the detection device 300, and printed code 20 on a paper medium 220 as a preferred embodiment of the invention. However, it is contemplated that in accordance with the invention that the detection device 300 may be some other device used to detect the feature or attribute. For instance, where the feature or attribute being detected is optical, as would be the case with a hand-held optical reader device, a different form of optical reading device, such as by way of example, a non-portable, stationary device, may be used. Alternatively, a code 20 may be associated with, for example, a source or substrate 220 that conveys sound or light, or a substrate on which chromatically varying signals are provided. In such embodiments, the detection device 300 may be, for example, a frequency detector (used to detect sound or light frequencies), or a chromaticity detection device. One of ordinary skill in the art having the present specification and drawings before them would understand that the scope of examples extends beyond those specifically mentioned here and be able to apply the teachings set forth herein to those other examples with only reasonable effort.

Figure 3:
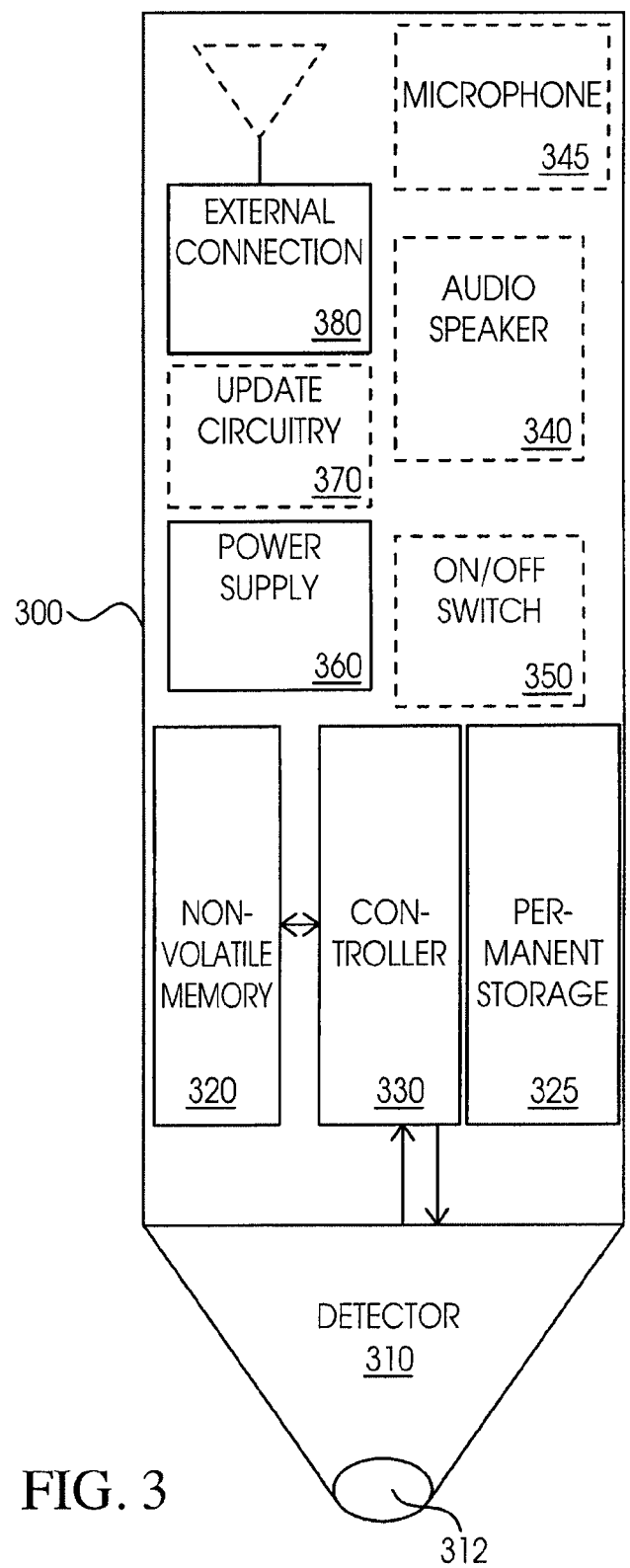
FIG. 3 illustrates a representation of components comprising a detection device used in connection with one implementation of the described invention.

FIG. 3 illustrates a high level block diagram of a detection device 300 for use in connection with the described system. While the particular form factor for the detection device 300 shown in FIG. 3 is that of a hand-held pen-shaped detector, (referred to for simplicity herein as simply a "pen reader" or a "hand-held device"), it will be understood by those of ordinary skill in the art that such a form factor is simply an application-specific design choice. As shown in FIG. 3, the detection device 300 of the system 200 comprises a sensor 310 capable of sensing the code 20; non-volatile memory 320; and a controller 330, and a power supply 360 (such as a battery). The system may, in addition, optionally include an audio speaker 340, for outputting audio information corresponding to the detected code and on/off switch 350.

The interconnections between the elements in FIG. 3 are not shown to avoid obscuring the invention especially since such connections are already well understood in the art. As explained above, it is contemplated that the system 200 may be incorporated into any stationary, hand-held or other portable device having appropriate detection capabilities. So, for instance, it is contemplated that a mobile telephone, PDA or other handheld communication device may incorporate a CMOS camera (or a code reader associated therewith) as a detection device 300 for use in connection with the present system 200. While the present disclosure may speak in terms of "touching" the detection device 300 to the source, medium or substrate 220, this term should be understood for purposes of the present disclosure to encompass not only physically touching the sensor window 312 of the detection device 300 to the medium, source or substrate 220, but also bringing the sensor window 312 in sufficiently close proximity to the medium, source or substrate 220 for the detector 310 to detected the selected code 20. The sensor window 312 may be varied in size depending upon design choice.

The non-volatile memory 320 of the detection device 300 is preferably rewriteable and may be removable from the housing of the detection device 300. The non-volatile memory 320 may also be physically fixed within the detection device 300. The non-volatile memory 320 may be proprietary or may be selected from commonly available forms of non-volatile memory 320, such as EEPROM, EPROM, Flash Memory, SDRAM, SRAM, and memory cards, including, but not limited to, CompactFlash (CF), JEIDA, Memory Stick (MS/MS-PRO), miCard, Microdrive (MD), MultiMediaCard (MMC), Secure Digital (SD), microSD, SmartMedia (SM), and xD-Picture. The non-volatile memory 320 may be used, among other things, to store codes, audio content, programming and/or other information used by the controller 330 to operate the desired functions of the detection device 300, as will be discussed more fully below. The audio may be encoded or raw and may comprise music, sound effects, and/or even speech synthesis data.

Figure 4:
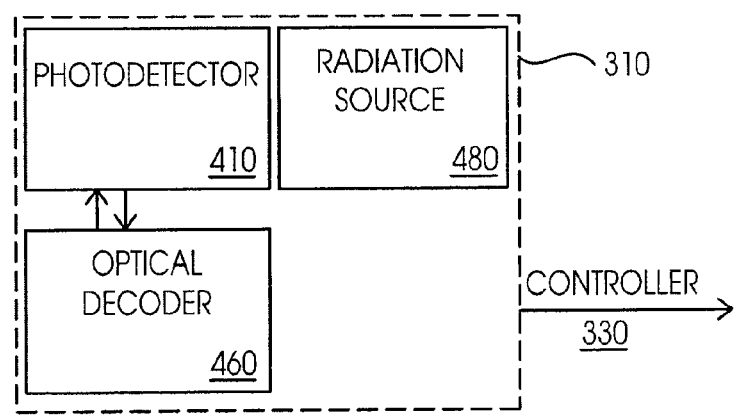
FIG. 4 illustrates a block diagram of an optical reader which may be employed in the hand-held device represented in FIG. 3.

Preferably, the non-volatile memory 320 of the detection device 300 is rewriteable, although it is possible that a portion of the non-volatile memory 320 will be write once storage (WORM) or even read only memory (ROM) which shall be referred to as permanent storage 325 (FIG. 3). It is contemplated that the detection device 300 may be assigned a unique identification number, which would be stored in either WORM or ROM either at the factory or by a company deploying the detection device 300. Where the detection device 300 includes rewriteable memory, the device may further include circuitry capable of rewriting the rewriteable, non-volatile memory 320. The update circuitry 370, as shown in FIG. 4, may interface with external devices, such as a specialized computer, a general-purpose computer, or a remote server, via a wired or a wireless connection.

Where the external connection 380 is wireless, the detection device 300 would further include a radio transceiver. The wireless connection could be 2G, 3G, Bluetooth, CDMA, DECT, TDMA, UMTS-TDD, WiBro, WiFi, or WiMAX to name a few; Wired connections may be proprietary or constructed in accordance with a standard such as USB or FireWire (IEEE-1394).

The controller 330 of the detection device 300 may be comprised of any group of electrical components, firmware and software sufficient to operate the functions of the detection device 300. Among the potential groups of electrical components for implementing the controller 330 are general-purpose microprocessors, special purpose microprocessors, and ASICs. The controller 330 will have likely have volatile memory elements (e.g. registers) and access to the non-volatile memory 320. In some instances, the controller 330, itself, will preferably have separate non-volatile memory 320, which comprises a part of the overall non-volatile memory 320 of the detection device 300. The controller 330 provides a means for controlling the functions of the detection device 300 and coordinating those functions to produce the functionality disclosed herein. The controller 330 may also keep real time or at least system time.

The optional audio speaker 340 of the detection device 300 is primarily used to provide audible instructions, information and other feedback to the user of the detection device 300. The controller 330 is operably connected to the audio speaker 340, such that pre-recorded audio, synthesized audio, or text-to-speech output may be audibly played through the audio speaker 340. It is contemplated that the detection device 300 could also include an audio jack such that an external headphone or independently-amplified external speaker could be used instead of or in addition to the audio speaker 340 in the detection device 300.

The on/off switch 350 of the detection device 300 would preferably be a slider switch, but could be a momentary contact switch or any other type of electro-mechanical switch. In a preferred embodiment, the on/off switch 350 may be a three position slider switch. Those three positions are preferably: off, on at a low volume, and on at a higher volume. It would be understood by those skilled in the art having the present disclosure before them that the on/off switch 350 could be a two-position switch with preset volume or volume selectivity could be provided by a potentiometer with an adjustment wheel or knob accessible on the face of the housing.

Figure 1A:
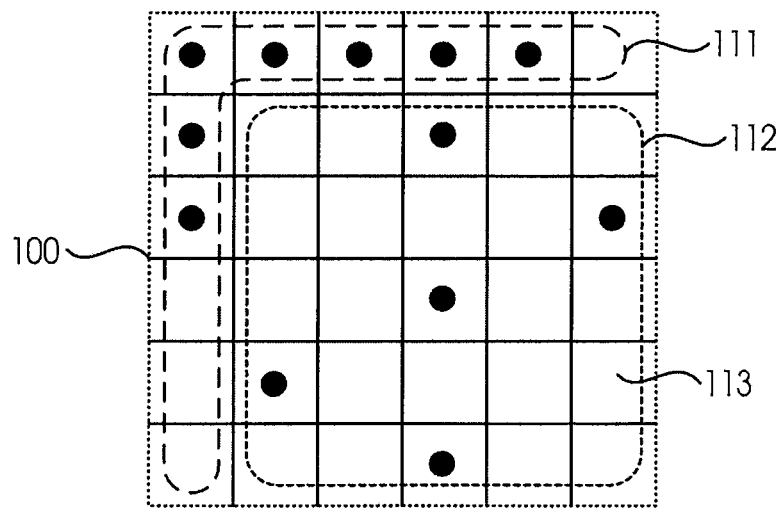
FIGS. 1A, 1B and 1C illustrate prior art embodiments of graphical indices.
Figure 1B:
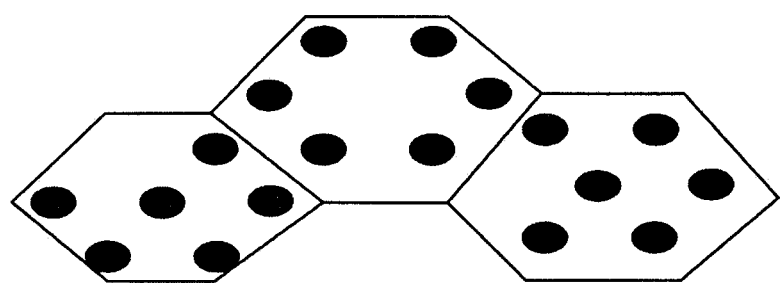
Figure 1C:
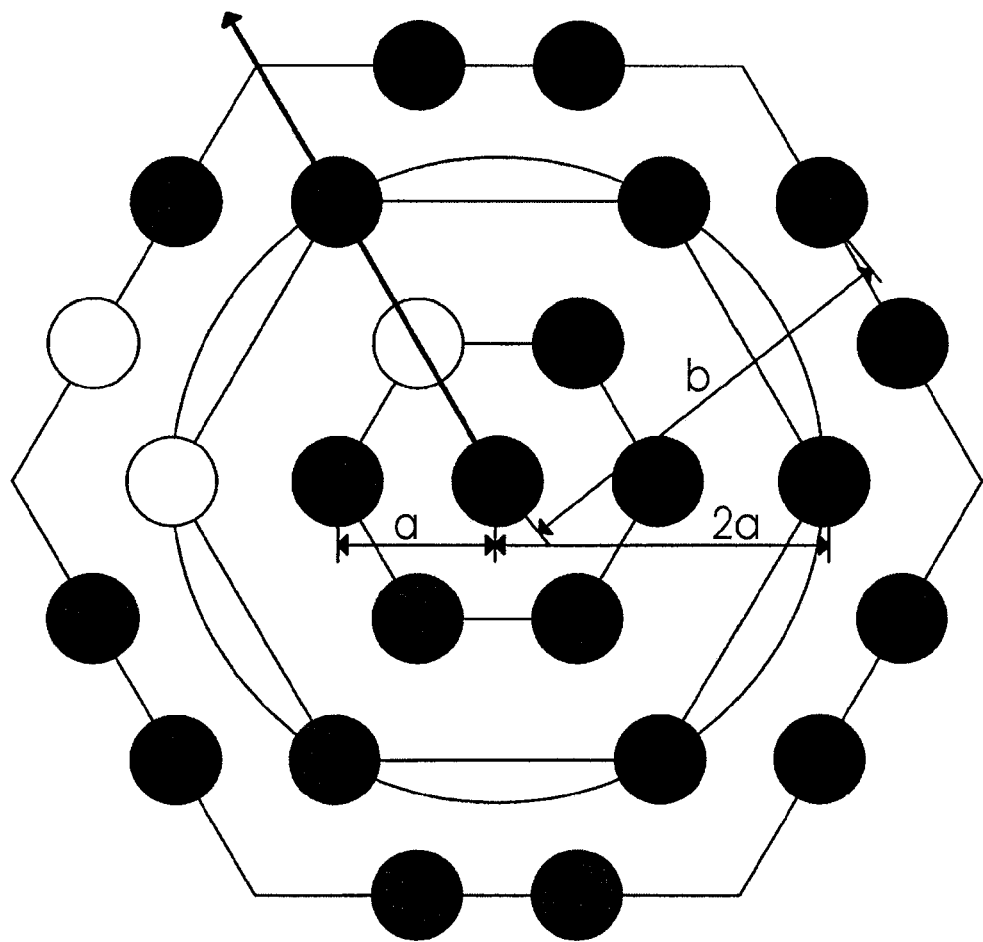

The power supply 360 of the detection device 300 is preferably a battery. The battery may be a disposable or a rechargeable battery. In the case of a rechargeable battery, the detection device 300 would include charging circuitry and would preferably include software to optimize the recharging of the battery. As is known, where the detection device 300 includes a USB port (see 380, FIG. 1), external power may be provided to the device via the USB port to recharge the battery. In an embodiment with no physical ports, inductive charging may be used as is well known in the art. The detection device 300 would also preferably include a low-battery warning mechanism. Power supply 360 may also be a power supply that converts standard wall power to appropriate voltage levels for the circuitry of detector 300.

The detection device 300 may also optionally include a microphone 345. In such an embodiment, the controller 330 would also have the ability to record the audio input via the microphone 345. This recorded audio may be saved in its analog form or may preferably be digitized. In some embodiments, the controller 330 may include a speech-recognition engine that translates the audio into text. The audio or digital representation thereof (either pure digital or text-translation) may be stored by the controller 330 in the detection device 300 or that audio may be transmitted either wirelessly or by wire to or from a computer or remote server.

FIG. 4 shows an example implementation of the invention using any optical reader as the detector 310. In such an embodiment, the detector 310 may include a photodetector 410 and an optical decoder 460. The photodetector 410 may comprise a single row, but preferably includes a two-dimensional array of semiconductor devices (such as a charge-coupled device (CCD) or CMOS optical sensors), each associated with an amplifier and an optical filter. The optical filter generally allows a band centered wavelength of light to pass. The center of the band of frequency or frequencies selected depends upon the printed code system chosen. The size of the semiconductor row or array may also be adjusted depending upon the printed code system selected. For instance, in an embodiment deployed with a PDA or mobile telephone CMOS camera, at least three wavelengths (i.e., blue, green, and red) will be filtered and, hence, sensed so the printed code system may be selected to take advantage of the ability of an array to sense one, two or all three wavelength bands of light. In an embodiment where the printed code system relies on infrared wavelengths, the optical reader 310 may also include a source of infrared radiation 480, such as a LED and the filter pass-band would be selected accordingly.

The image or marks (as described further below) sensed by the photodetector 410 is read out into the optical decoder 460, which may be part of the controller 330 or a discrete set of circuitry. The optical decoder 460 gathers the sensed optical signals and translates those signals into images that are matched against the known aspects of the selected printed code (wherein such translated signals may be referred to generally as "image data" or "translated data"). Once the optical decoder 460 generates such image data, the image data is passed out of the optical reader 310 to the controller 330 for processing of the image data.

Figure 5:
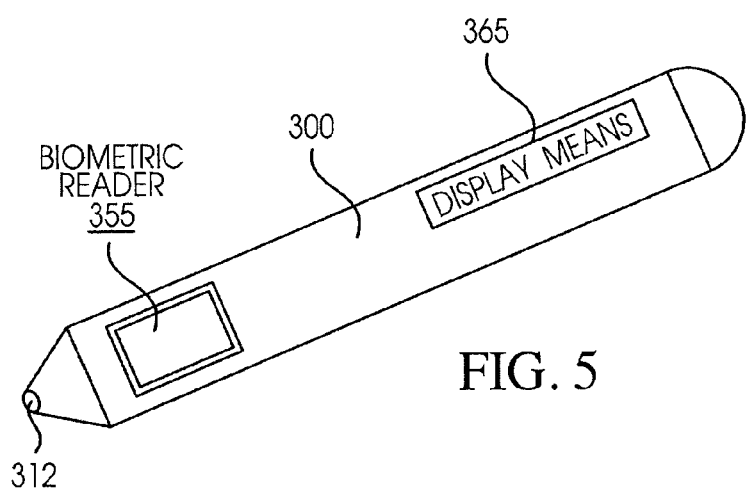
FIG. 5 illustrates an alternative implementation of the hand-held device represented in FIG. 3.

As shown in FIG. 5, even a pen-reader form factor housing of a detection device 300 may optionally include a visual display means 365 on the housing. The visual display means 365 may be as simple as a single, colored light emitting diode or it may be as complex as a liquid crystal display (LCD) or LED display, such as those found in hand-held calculators. The controller 330 would drive the visual display means 365 as is known by those in the art.

As also shown in FIG. 5, the detection device 300 may optionally include one or more biometric sensors 355, such as a fingerprint reader, or biometric analysis such as a voice-analyzer or handwriting analyzer. One or more of these biometric sensors 355 may be used alone or in combination with each other and/or a password to provide some level of security for the system. The controller 330 would support the biometric sensing capabilities using peripherals. For instance, where voice analysis is used the microphone 345 would be used in combination with the controller 330 and memory to judge whether the user is matched with detection device 300. In another example where handwriting analysis is used, the detection device 300 would further include an ink cartridge and could further include an accelerometer and/or a pressure sensor to judge the speed, angle and pressure of the user's writing style. The detection device 300 may also have the ability to perform optical character recognition.

In an embodiment including biometric or other security, once the user identity is sufficiently confirmed, the detection device 300 may communicate with the outside world using unique identification number assigned to that the detection device 300. In secure transaction environments, the communications will be encrypted and otherwise secured by the controller 330. That communication may be further secured after the first communication hop taken by communication outside of the detection device 300, e.g. the personal computer to which the hand-device is operably coupled.

The detection device 300 may be used in a variety of applications, including in the healthcare field, authentication and security applications, education/instructional applications, museum or theme park applications, financial/legal applications, marketing applications, military/training applications, music and entertainment applications, ticket applications, and desktop printing applications, just to name a few. In fact, the more security sensitive the application (e.g., healthcare, financial, military) may be further secured using the novel coding architecture disclosed herein below.

In connection with the system 200 described above, a novel coding architecture as will be described may be used for the code 20. Generally, such coding architecture includes marks made up of a plurality of patterns, each pattern being made up of pattern elements, as described below. Each of these components used in the coding architecture will be described in detail.

Pattern Elements

A "pattern element" as used herein is the smallest distinct component of a pattern used to encode data in the coding architecture of the present invention. Pattern elements may be uniform and homogeneous, but neither uniformity or homogeneity is required. In a system that uses optical codes, the pattern elements may be as simple as a microscopic dot, but is not limited as such. Any attributes for an optical pattern element may be exploited as appropriate for a given application, including for example, shape, area, chromaticity (not necessarily limited to the visible spectrum), or circumference.

Figure 6:
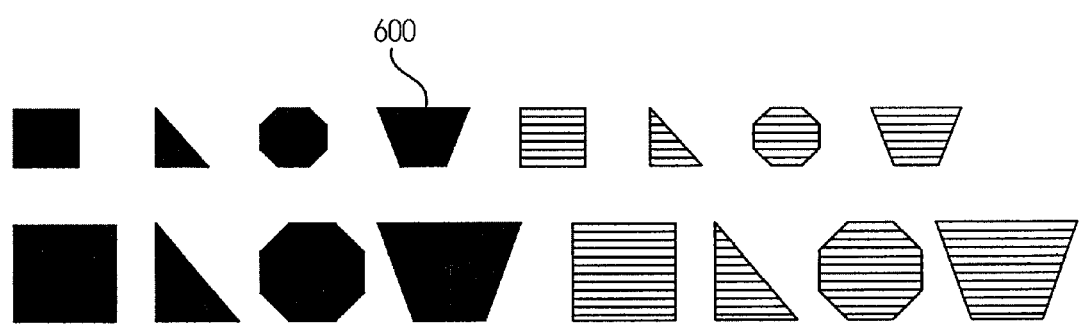
FIG. 6 illustrates example implementations of different pattern elements for use in connection with coding architecture in accordance with the invention.

FIG. 6 illustrates how different optical attributes of pattern elements 600 may encode data. As explained above, attributes of shape, area and/or color may be used to distinguish each pattern element 600. Each pattern element 600 may be used to convey information within a larger base pattern which may be included in an overall mark, as will be described in detail below. For example, as shown in FIG. 6, the pattern elements 600 may take on a particular shape (square, triangle, octagon, quadrilateral), a particular size (as illustrated by, for example, the different sizes of squares, triangles, octagons, quadrilaterals, respectively), or a particular color.

Such attributes of the pattern elements described above and shown in FIG. 6 are only examples, and persons of ordinary skill in the art having the current specification, drawings and claims before them would understand that any attributes of a pattern element may be used to give that element meaning and a distinct value in its application context. Any attribute of a chosen pattern element that allows it to be detected within its larger environment or background, and distinguished from other pattern elements within a set of pattern elements may be used.

Depending on the application in which the coding architecture is used, a pattern element may be identified based on any detectible attribute that may be discriminated relative to other like pattern elements. Such attributes include, by way of example only, physical dimension(s), mass, volume, relative altitude above a surface, magnetism, electric charge, signal frequency or amplitude, chemical composition or concentration. Each of the foregoing attributes may be used to distinguish distinct pattern elements. Examples of how some non-optical pattern elements are implemented in accordance with the invention are illustrated in FIGS. 7A-7C.

Figure 7A:
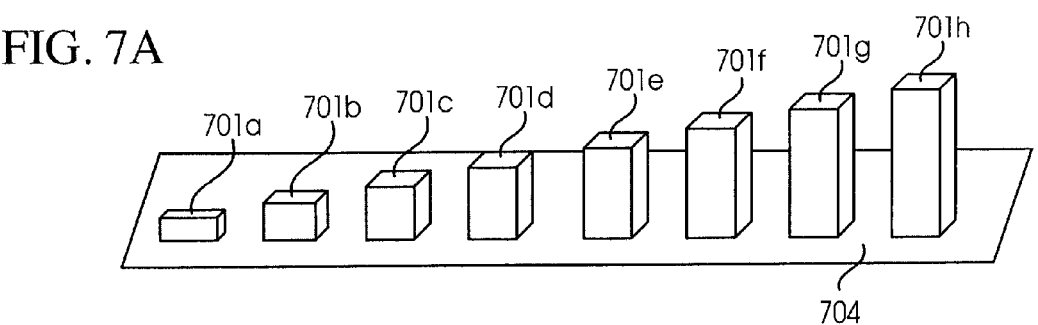
FIGS. 7A-C illustrate how different physical attributes other than optical attributes may encode data. In particular.
Figure 7B:
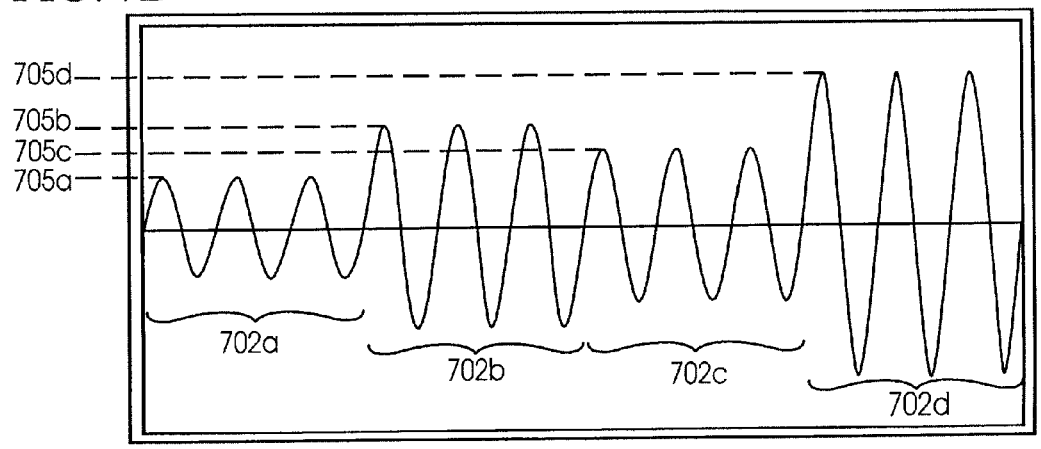
Figure 7C:
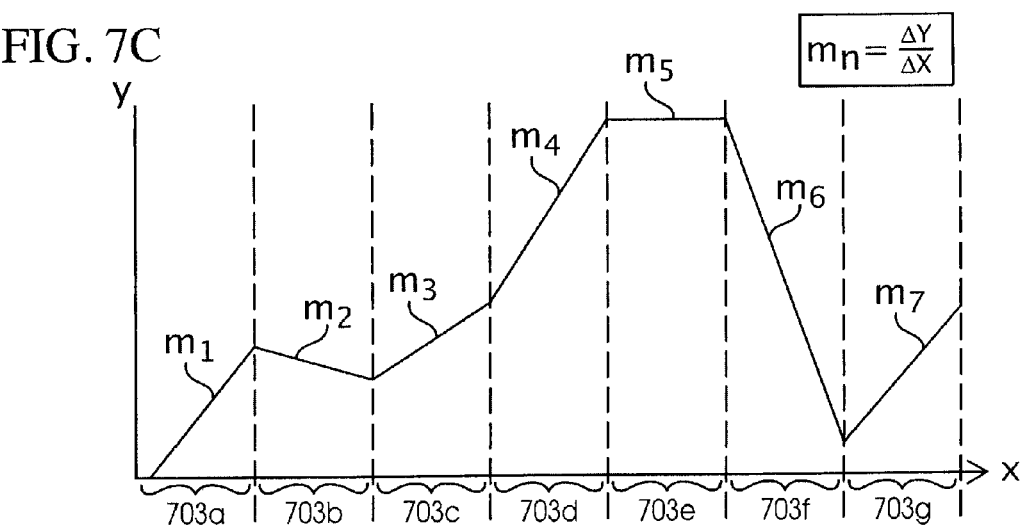

FIG. 7A illustrates a plurality of pattern elements, 701a-701h, each of which is distinguished or identified by their respective elevation above a surface 704. FIG. 7B illustrates a plurality of pattern elements 702a-702d identified or distinguished by their respective amplitudes 705a-d (or frequencies) associated with the corresponding pattern elements 702a-d (e.g., the color or intensity of a light signal; the volume or pitch of a sound signal). As illustrated in FIG. 7C, a plurality of pattern elements 703a-g identified or distinguished by some rate of change (i.e., slopes $m_1$-$m_7$, identifying a rate of change over, for example, time or distance) of a given attribute (e.g., voltage, temperature or magnetism, where the code is made up of an electrical, thermal or magnetic signal, respectively). In addition or alternatively, an algorithm may be implemented to compound multiple attributes of a pattern element, such as the sum or product of the length of sides of each pattern element, or the sum or product of distances between the center of gravity of two or more pattern elements. The center of gravity of an optical pattern element (sometimes referred to as its spatial center of gravity) is the location of an imaginary point, relative to the overall pattern element (including all pixels or other components that make up the pattern element), where the total area of the pattern element may be thought to be concentrated.

Patterns and Tiles

A "pattern" is a structured collection of zero or more pattern elements within a pattern element zone (which may be referred to herein as simply a "zone"), which generally conveys an application specific data payload useful in constructing a "mark" (as described below). Each zone provides a region of space (i.e. two, three or four dimensional space, as appropriate) wherein a pattern element may be detected. Thus, each pattern will be described herein as being implemented within a "tile" of such pattern element zones. A tile, as used in a particular application, is an arrangement of zones in an application variable space (i.e. two, three or four dimensional space, as appropriate) and provides one or more points of reference for encoding and decoding of each pattern of pattern elements. A tile's dimensions, geometry, spatial resolution, duration and other metrics are application specific and are driven by pattern deposition and detection limitations, as will be understood by persons of ordinary skill in the art having the present specification, drawings and claims before them.

Figure 8A:
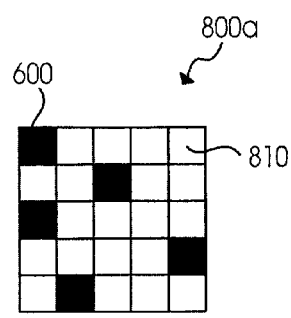
FIGS. 8A, 8B, and 8C illustrate several sample tile structures which may be used in implementations of the invention.
Figure 8B:
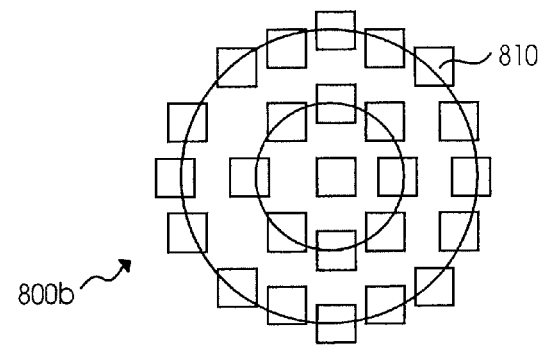
Figure 8C:
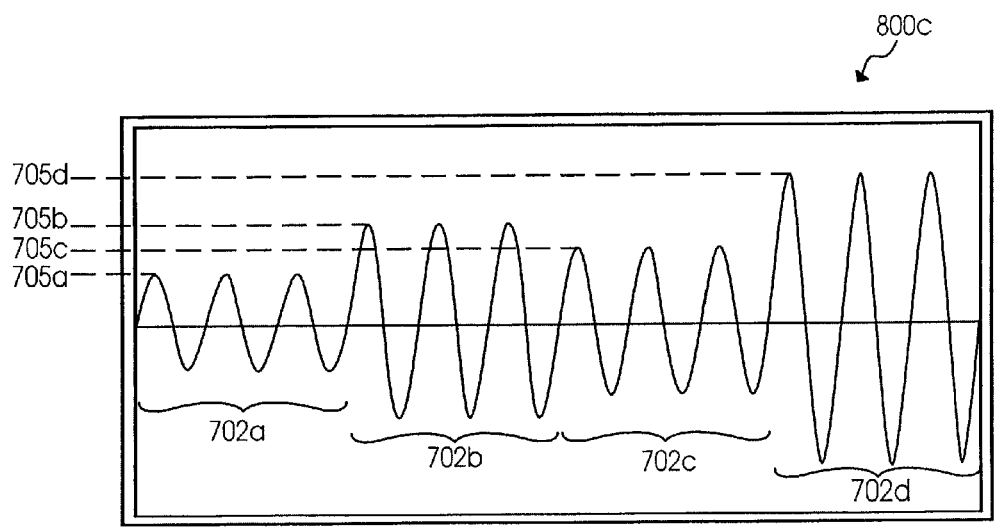

FIGS. 8A through 8C illustrate various potential tile structures 800a, 800b, 800c, respectively, which may be used in appropriate implementations of the invention. FIG. 8A (which includes pattern elements 600 located within the tile 800a in a sample pattern) illustrates a two dimensional 5×5 matrix tile 800a having twenty-five zones 810, wherein the pattern is defined by the arrangement of pattern elements 600 located in (or absent from) the pattern element zones 810. FIG. 8B illustrates a tile 800b made up of a non-linear arrangement of zones 810, wherein the pattern is also defined by the arrangement of pattern elements located in (or absent from) the pattern element zones 810 in the tile 800b. FIG. 8C a tile structure 800c corresponding to a patter in the time domain, where the pattern is made up of a plurality of pattern elements 702a-702d, each of which is identified or distinguished by its respective amplitude 705a-d (or frequencies) (e.g., the color or intensity of a light signal; the volume or pitch of a sound signal). Other tile structures are also contemplated including, but not limited to, combinations of the foregoing exemplary tile structures 800a, 800b and 800c, as well as other structures as would be understood by persons of ordinary skill in the art having the present specification, drawings and claims before them.

Pattern Signatures

Each pattern of pattern elements 600 in a tile 800 has an arithmetically calculated signature associated with it. The pattern's "signature" is a predetermined or pre-specified, application-specific, arithmetic calculation or derivation based on one or more selected physical attributes of the pattern elements 600 used within the pattern (referred to as a "pattern signature calculation"). Generally, a predetermined number of patterns, N (sometimes referred to as a "set of patterns" or a "pattern set"), are used to code data in a given application, and each pattern's signature is generally unique among all N patterns used by such particular application.

Figure 9:
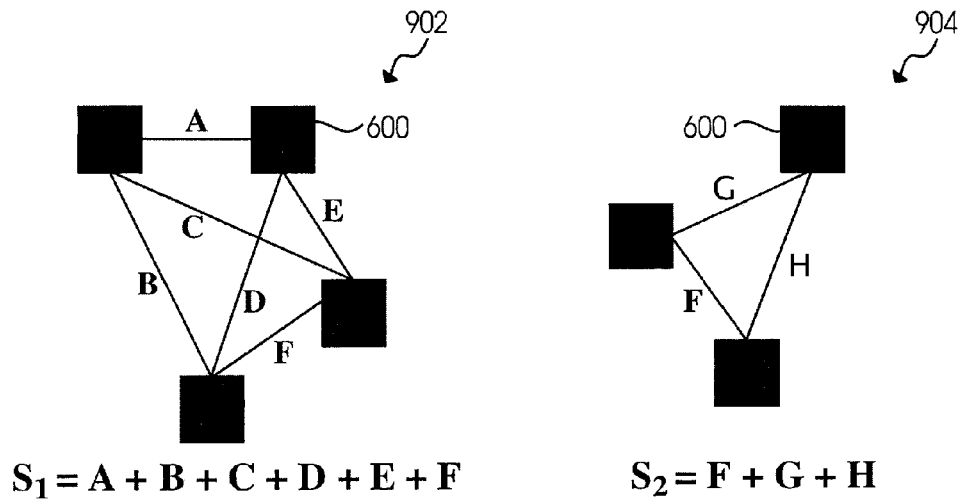
FIG. 9 illustrates two different patterns using the sum of all distances between the spatial centers of gravity of each of the pattern elements in the respective patterns, and how the respective pattern signatures may be calculated in one implementation of the invention.

Examples of pattern signature calculations in an optical embodiment include, without limitation, (a) the sum or product of all distances between the spatial centers of gravity of each of the pattern elements 600 in the pattern; (b) the sum or product of the spatial areas, volumes, radii or circumferences of the pattern elements 600 in the pattern; (c) the sum or product of the altitudes, masses, voltages, or other physical attribute(s) of the pattern elements 600 in the pattern; and (d) any combination of any of the foregoing. Similarly, in an application within the time or frequency domain, such as shown in FIG. 8C, the pattern signature calculation may be, for example, the sum or product of all amplitudes of each of the pattern elements 702a-d in the pattern. FIG. 9 illustrates a signature calculation for two different optical patterns 902, 904, using the sum ($S_1$ and $S_2$, respectively) of all distances between the spatial centers of gravity of each of the pattern elements 600 in the respective patterns 902, 904.

Examples of pattern signature in non-optical embodiments could include, for example where the pattern elements are distinguished by their respective elevations (see FIG. 7A), adding the elevation of the first three elements immediately following a pattern of two adjacent ones of the tallest elements 701h. In another example where the pattern elements are identified by some rate of change (see FIG. 7C), examples of pattern signatures could include searching for the occurrence of adjacent and opposite slopes (e.g. $m_6$ and $-m_6$) and then taking some mathematical result of a pre-determined number of slopes following the pattern signature marker.

Figure 10:
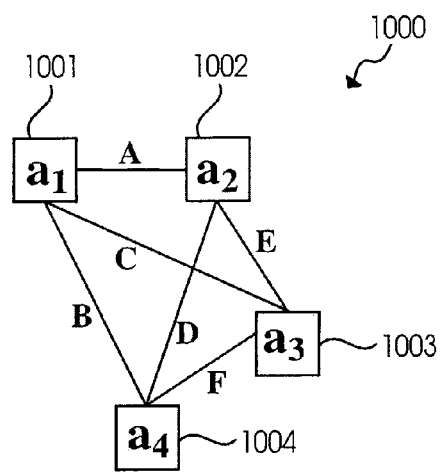
FIG. 10 illustrates the pattern element 902 illustrated in FIG. 9 subject to a different calculation to determine the pattern signature that may be used in another implementation of the invention.

Any pattern signature calculation may compound and incorporate multiple different attributes of pattern elements and relationships between attributes of the pattern elements for purposes of generating a larger population of patterns and/or greater pattern differentiation for the applicable detection and decoding method(s) used. For example, a pattern signature calculation may comprise the sum of the distances between pattern elements in the pattern, with each such distance being multiplied by the combined areas of the respective pattern elements. For example, as shown in FIG. 10, the signature S of the pattern 1000 would be calculated in this example as follows:

$$S=A(a1+a2)+B(a1+a4)+C(a1+a3)+D(a2+a4)+E(a2+a3)+F(a3+a4),$$

where each of a1 through a4 represents the area of the individual patter elements 1001-1004, respectively.

The complexity of the pattern signature calculation may be further increased by, for example, adding to each area value some distinct attribute value associated with the corresponding pattern element (e.g., a shape value such as if the pattern elements comprised different shapes; or a color value such as if the pattern elements comprised different colors or grayscales). As would be evident to persons of ordinary skill in the art having the present specification, figures and claims before them, the pattern signature calculation may comprise any number of added derivations, thus increasing the robustness of the coded data. By compounding attributes in the pattern signature calculation, a flexible design of a large number of unique patterns and pattern signatures is possible, where each pattern consists of a small number of pattern elements. Where the pattern is used in an optical detection application, using fewer pattern elements in a tile is advantageous, as it can be made nearly invisible to the naked eye, thus improving the aesthetics of the main image. Further, a large population of unique patterns permits each pattern to carry a large data payload without proportionately increasing the pattern's footprint within a tile. It is also contemplated that fewer than all of the pattern elements in a tile could be used in calculating the signature. The selection of which elements to exclude from the calculation may be made on the basis of the shape, color value, area or location within the pattern of the element.

Pattern Isomers

Figure 11A:
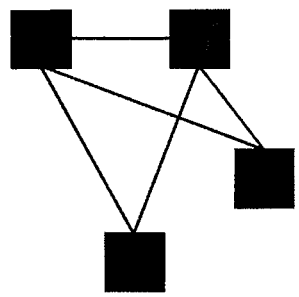
FIGS. 11A and 11B illustrate examples of pairs of isometric patterns.
Figure 11A:
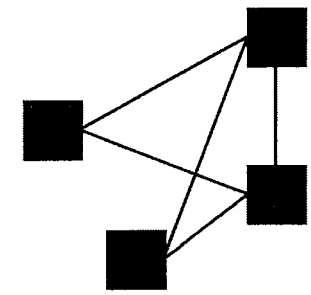
Figure 11B:
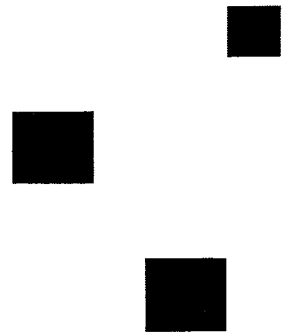
Figure 11B:
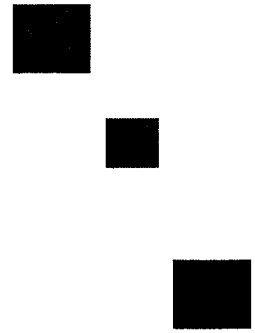

In one implementation of an embodiment of the invention, it may be desirable to utilize two or more distinct patterns in a pattern set having the same pattern signature. Such distinct patterns with identical signatures are isometric signature equivalents or "isomers" of each other. Isomers may arise, for example, where a sum-of-distances signature is used for optical patterns and the application includes two instances of the same relative arrangement of pattern elements transformed (such as shifted or rotated) within a tile arrangement. Because such patterns represent visually distinguishable presentations, they are considered to be distinct patterns. However, they are isometric signature equivalents because their pattern signatures are identical. FIGS. 11A and 11B illustrate examples of two different pairs of isomers, each pair having a different pattern signature. In FIG. 11A, Pattern 2 is a visually distinguishable presentation of Pattern 1, in that it is Pattern 1 rotated by 90°. However, although Patterns 1 and 2 are visually distinguishable (and thus separate and distinct patterns), they would have the same signature in an application using a sum-of-distances pattern signature calculation. Similarly, in FIG. 11B, although Pattern 1 and Pattern 2 are visually distinct, the sum of the areas of the pattern elements (i.e., the pattern signature, in this particular example) within each of these distinct patterns is the same. Accordingly, they would have the same signature in an application using a sum-of-areas pattern signature calculation. Isomerism is not limited to the examples set forth herein. Other signature calculations may result in isomers as would be understood by those having ordinary skill in the art having the present specification, figures and claims before them.

Isomer patterns may be desirable for various reasons. For example, using isomers in adjacent tiles may allow a pattern to be deployed over a relatively large area without creating the large repetitive pattern that may become more visible to the naked eye. For another example, the use of visually distinguishable patterns having the same pattern signature or encoded value may support the implementation of a data security feature in connection with one embodiment of the invention. If the pattern signature calculation selected by a manufacturer or product developer is not generally known to the public, the existence of isomer patterns may result in an amount of encryption or encoding obfuscation that provides a measure of data security for various application specific conveniences. By making the number of distinguishable but isometric patterns large for the same data payload, isomers resist interpretation of pattern schemes through frequency analysis commonly used in cryptography. Persons of ordinary skill in the art having the present specification, figures and claims before them would further understand that since isomerism may be based on the particular pattern signature calculation used, having a large number of distinguishable but isometric patterns results in little to no disadvantage in performance for the capture and decoding of patterns by sensors and sensor based computing engines.

Pattern Payload

In accordance with certain implementations the present invention, each pattern within a tile may be assigned a data payload or string of bits. Once the respective strings of bits associated with each pattern in a tile are determined, the bit strings may then be assembled in some predetermined way to represent an overall data payload for the mark (sometimes referred to herein as the "mark payload" or the "overall payload"). In any given application, a sufficient number of distinct patterns having unique signatures may be generated and/or selected to convey the desired amount of data payload. For example, if it is desired that a pattern carries a data payload of four bits, then the application should define at least sixteen (i.e., $2^4=16$) patterns that are unique under the selected pattern signature calculation. If only two bits of data are desired for the payload then four ($2^2=4$) unique patterns should be provided. Likewise, if six bits of payload are required, then sixty-four ($2^6=64$) unique patterns should be provided.

Generally, each unique pattern signature is assigned a set of data bits which the corresponding pattern, or its isomer(s), contributes into a larger mark data payload, as further described below. In accordance with the invention, the data payload assigned to an individual pattern may be fixed, but such a characteristic is not required. Rather, the data payload assigned to a mark may vary, depending on, for example, the particular pattern signature calculations used to determine the pattern's signature. In an application where an individual pattern's data payload is fixed, any number of such assignments may exist across different applications. For example, in one application, a given pattern may be assigned a data payload having the value 1234 (corresponding to a first bit string sequence), while the same pattern in a different application may be assigned a data payload having the value 2341 (corresponding to a different bit string sequence).

Figure 12:
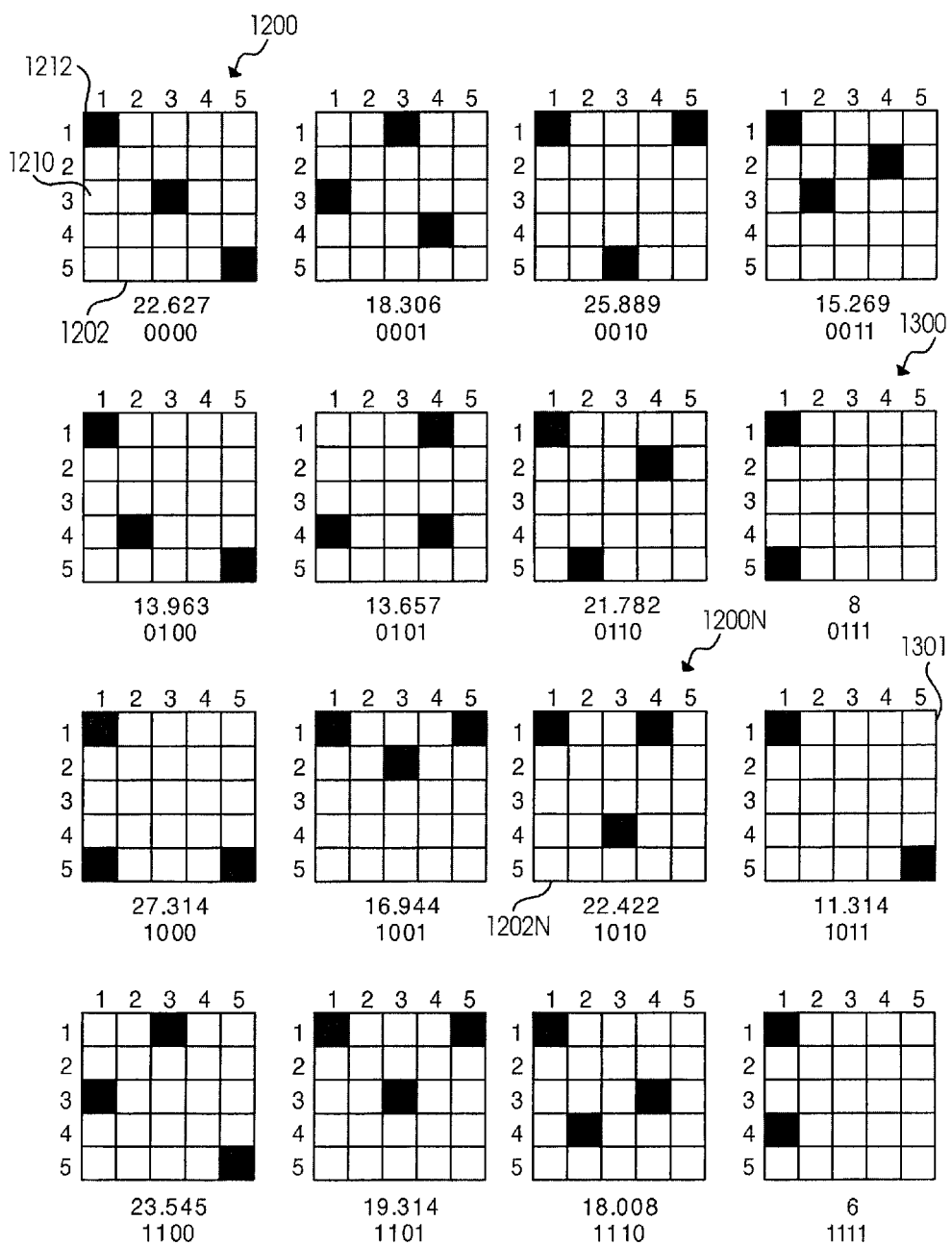
FIG. 12 illustrates an example implementation of a set of patterns for a coding scheme having a four bit data payload in accordance with one implementation of the invention.

FIG. 12 illustrates an example implementation of a coding scheme where each pattern conveys a four bit data payload. As shown in FIG. 12, a set of sixteen patterns (i.e., $2^4=16$) 1200 may be generated to support a four-bit coding scheme. Each pattern shown in the example scheme of FIG. 12 is implemented in a tile 1202 made up of a 5×5 matrix of pattern element zones 1210, each pattern 1200 comprising two or three pattern elements 1212, which are indicated—in the example embodiment of FIG. 12—by filling in a zone with black ink. As would be understood by those of ordinary skill in the art having the present specification, drawings and claims before them, pattern elements 1212 could be indicated by another color or even by the absence (i.e. open) of color in the zones. In this particular example of FIG. 12, the pattern elements are also uniform and each tile structure is rectilinear; however one of ordinary skill in the art having the present specification, figures and claims before them would understand that neither feature is a requirement.

In this example scheme, while any suitable pattern signature calculation may be selected, by way of example only, the signature of each pattern has been determined according to the sum of the distances between all combinations of pattern elements 1212 within the pattern. The signature calculated for each pattern using the selected illustrative example is indicated just below the pattern's respective tile 1202 shown in FIG. 12. In this example, this signature value is fixed for each pattern 1200 within the example. The assigned data payload (bit string) of each pattern 1200 in this example is further shown in the second value beneath each pattern 1200. So for example, the signature value for the pattern 1200 at tile 1202 is equal to 22.627, and the data payload (bit string) assigned to the pattern 1200 is 0000. In another example, the signature value for the pattern 1200N at tile 1202N is equal to 22.422, and the data payload (bit string) assigned to the pattern 1200N is 1010.

Figure 13A:
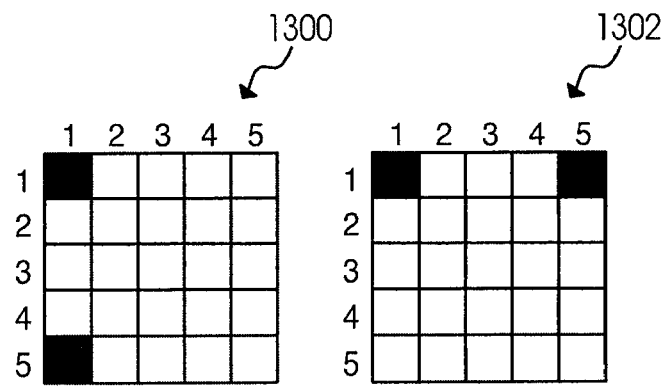
FIGS. 13A and 13B, respectively, illustrate isometric signature equivalents of two of the patterns from the pattern set of FIG. 12.
Figure 13A:
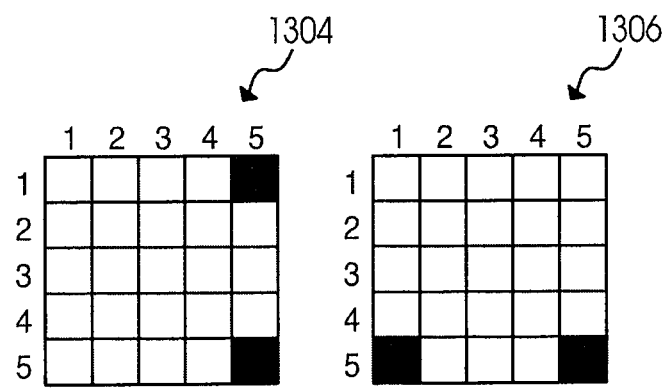
Figure 13B:
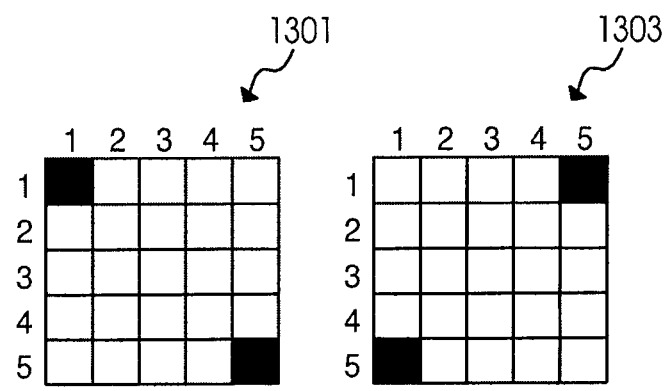

It is noted that many of the patterns 1200 shown in FIG. 12 will have one or more isomers (i.e., patterns which carry the same signature value for the selected pattern signature calculation), and are therefore assigned the same data payload. For example, the pattern 1300 in FIG. 12 (having a signature value of 8 and a data payload of 0111) has 4 isometric equivalents (i.e., isomers), as illustrated in FIG. 13A. While the patterns 1300, 1302, 1304 and 1306 are visually distinct it is clear to see that the signature values (where the signature of each pattern is determined according to the sum of the distances between all combinations of pattern elements within the pattern) for each of these visually distinct patterns 1300, 1302, 1304 and 1306 is the same. As another example, the pattern 1301 in FIG. 12 (having a signature value of 11.314 and a data payload of 1011) has 2 isometric equivalents (i.e., isomers), as illustrated in FIG. 13B. While the patterns 1301, 1303 are visually distinct (again, using sum of the distances between all combinations of pattern elements within the pattern to determine the signature value), the signature values for each of these visually distinct patterns 1301, 1303 is the same.

Marks

Using the applicant's terminology convention, a "mark" is an arrangement or collection of patterns within tiles; conceptually, it is a pattern of patterns. The type and arrangement of tiles within a mark is application specific and is not necessarily fixed within a given application domain. For example, a mark may have any shape, configuration, or number of tiles, and it may be arranged in any number of dimensions (e.g., 2-, 3- or 4-dimensional). A mark is not necessarily uniform or symmetrical, nor does it require an explicit Cartesian coordinate system as part of the mark itself or as part of the collection of marks. FIGS. 14A through 14D illustrate four example tile arrangements 1402, 1404, 1406, 1408 that may be used to construct a mark. In one implementation, each tile 1410 may be separated by a gutter space 1412. As explained further below with respect to guide patterns, the gutter space 1412 may be as thick or narrow as is reasonable for the situation.

Guide Pattern

A "guide pattern" may be used to locate and identify a given tile structure (which may include orientation therof) for an individual mark. Each guide pattern may be defined or recognized by a predetermined unique feature (referred to as a "guide pattern feature"). The guide pattern acts as a reference pattern that may be used to define the overall configuration of the mark as well as the patterns within an individual mark. The guide pattern may also further specify the pattern signature calculation to be used to evaluate the patterns of the mark or identify the method of assembly for the mark's data payload from the component data payloads of the other patterns in the mark. Preferably, each mark includes at least one guide pattern. As further explained below, the guide pattern may be defined by its signature, or by some other guide pattern feature that is capable of defining the guide pattern as unique. A guide pattern may, but does not necessarily, carry its own data payload.

Figure 14A:
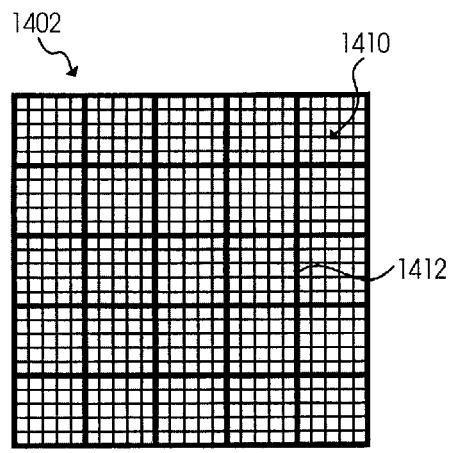
FIGS. 14A, 14B, 14C and 14D illustrate four example tile arrangements that may be used to construct a mark in accordance with four implementations of the invention.
Figure 14B:
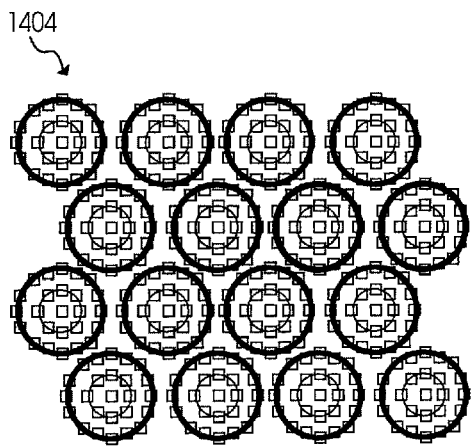
Figure 14C:
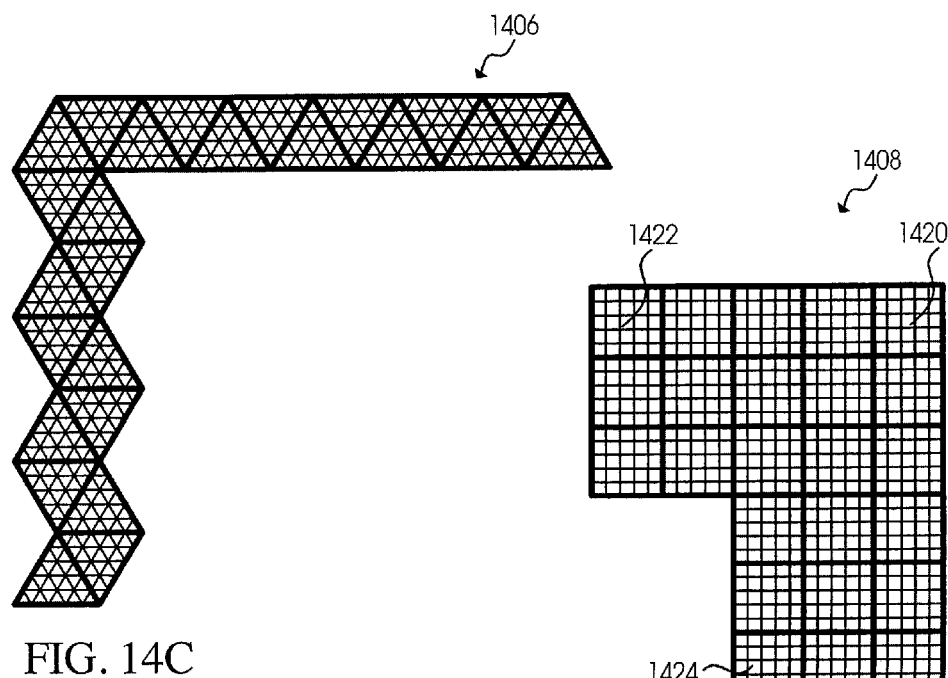
Figure 15:
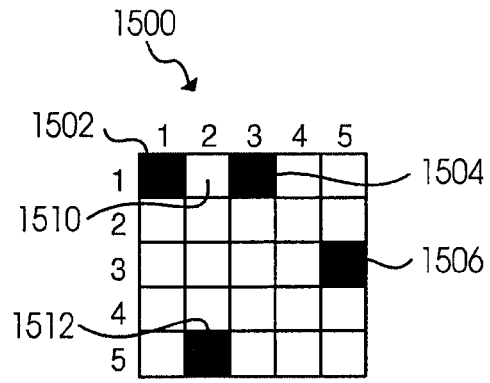
FIG. 15 illustrates an example implementation of a guide pattern for the pattern set shown in FIG. 12, and the mark structure 1402 shown in FIG. 14A.

FIG. 15 illustrates an example implementation of a guide pattern 1500 for the pattern set shown in FIG. 12, and the mark structure 1402 shown in FIG. 14A. In guide pattern 1500, the distance between pattern elements 1502 and 1504 represents the shortest distance between any two pattern elements within any pattern 1200 in the pattern set of FIG. 12. This "shortest-distance" guide pattern feature is the unique feature that may be used to define or distinguish the guide pattern 1500 from the other patterns 1200 within the pattern set. However, other unique guide pattern features may be used in addition, or instead of, the shortest-distance feature used in this example. For example, where a sum-of-areas approach is used as a pattern signature calculation, the guide patterns may be identified by, for example, using a pattern element having a smaller size than is used in any other pattern in the corresponding set of patterns. In this example, identification of the smallest pattern element results in identification of the guide pattern. However, the guide pattern itself may have any number of other pattern elements, thus allowing the particular application to take advantage of an exceptionally large number of possible guide patterns. Alternatively, a particular signature value using the sum-of-areas approach may be assigned to guide patterns, thus any pattern structure having that signature value may be used as a guide pattern, again giving a large number of possible guide patterns.

Using the shortest-distance as the guide pattern feature, the pattern elements 1502 and 1504 in FIG. 15 are separated by one pattern element zone 1510, whereas the distance between all other pattern elements within any pattern 1200 in the pattern set of FIG. 12 is greater than the width of one pattern element zone 1510. In this example, it is possible that two pattern elements from adjacent patterns may be adjacent. Where a shortest-distance guide pattern feature is used, a gutter space (1412 of FIG. 14A) may be provided between adjacent tiles in a mark to ensure that the shortest-distance rule for the guide pattern is not met by two adjacent patterns. For example, each zone 1210 and pattern element 1212 in the set of patterns 1200 shown in FIG. 12 may be, for example, two pixels wide. In this example, a guide pattern is identified based on two pattern elements within the guide pattern (1502, 1504 in FIG. 15) having a shortest-distance of any two pattern elements in a mark. In order to distinguish adjacent pattern elements from adjacent tiles, a gutter of more than two pixels may be provided. Accordingly, the adjacent pattern elements in adjacent tiles would not be misinterpreted by the controller as pattern elements from a guide pattern.

In one application of the invention, a standard home color inkjet printer may be used to apply printed code 20 on a surface 220. In such a situation it may be desirable that the system be available for widespread commercial use. Generally, as of the time of the invention, most or many home color inkjet printer are configured to print at 600 dpi or higher. Using a printer with 1200 dpi would allow implementation of the coding architecture with a 2 pixel by 2 pixel area for each zone 1210 mentioned in the prior paragraph. Whereas, using a printer at 600 dpi would facilitate implementation of only a single pixel zone.

It will be apparent to persons of ordinary skill in the art having the specification, drawings and claims before them that the above-described configuration and alternatives provide almost endless design choices for a coding architecture in accordance with the invention. For example, any number of the alternative guide patterns 1600(a)-(f) may be included in each mark, and/or each such alternative guide pattern used in the mark may be located in any number of the tile locations. In addition, or in the alternative, the aggregate bit payload of the mark may be concatenated in variable sequences, summed, multiplied or encrypted using variable keys to render the ultimately desired mark payload.

Figure 14D:
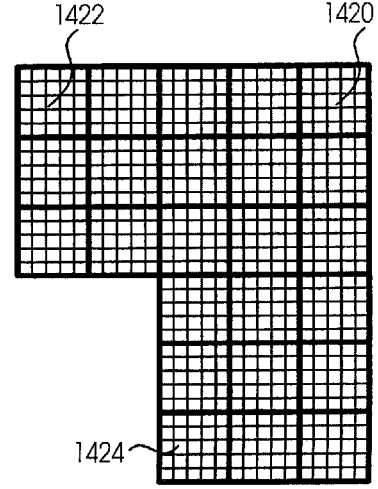

Applicant now provides an alternative example implementation utilizing a variety of the above-described options and alternative design choices. In this sample implementation, the tile structure 1408 shown in FIG. 14D is utilized, as are the patterns 1200 in the pattern set of FIG. 12, and the alternative guide patterns shown in FIG. 16. The tile structure 1408 is utilized in this example to illustrate implementation of non-uniform (as opposed to uniform, as shown at 1402 in FIG. 14A) marks.

In this example, a first guide pattern 1600(b) having a first signature value may indicate that the guide pattern 1600(b) is located at the top right corner 1420 of the tile structure 1408 for the mark, a second guide pattern 1600(c) having a second signature value may indicate that the guide pattern 1600(c) is located at the top left corner 1422 of the tile structure 1408 for the mark, and yet a third guide pattern 1600(c) having a third signature value may indicate that the guide pattern 1600(c) is located at the bottom left corner of the tile structure 1408 for the mark. Depending on the location of the guide pattern within the mark, the overall payload for the mark may be assembled in different ways (e.g., sequentially starting at top left to bottom right moving horizontally; sequentially starting at top left to bottom right moving vertically; sequentially starting at bottom left to top right moving horizontally; sequentially starting at bottom left to top right moving vertically). The scalability of this example may be further enhanced by using isometric pattern equivalents within the mark to create additional options for assembling the pattern payload, and thus further increasing the possible number of data payload values.

Data Payload Assembly

Once a tile structure is determined, such as based on a guide pattern as explained above, the mark's data payload may then be determined based on the data encoded into the tiles within the mark. As would be understood by one of skill in the art, the data payload of patterns within a mark may be assembled in a number of different ways to arrive at the overall data payload for the mark. For example, where a mark has the tile structure 1402 shown in FIG. 14, the data payload may be assembled by sequentially assembling the decoded bits from each tile moving across rows of tiles from left to right, starting at the top row and moving down to the bottom row. Alternatively, the data payload may be assembled by sequentially assembling the decoded bits from each tile moving down columns of tiles from top to bottom, starting at the left-most column and moving to the right. In one implementation, the data payload assembly for a mark may vary based upon features of the corresponding guide pattern for that mark, such that the process of assembling the data payload may involve one or more constant or variable transformations identified by any guide patterns within a mark. For instance, a guide pattern for a mark may indicate that the corresponding data payload for that mark (and/or the patterns within that mark) should be assembled by taking the tiles (and/or the pattern elements) in a counter-clockwise spiral outward from the guide pattern beginning at the 3 o'clock position. Another exemplary guide pattern may indicate a clockwise outward spiral and/or that the spiral begins at the 6, 9 or 12 o'clock positions. The possibilities in this regard are practically endless.

In one implementation of an embodiment, a guide pattern 1500 may be provided as shown in FIG. 15. As explained above, the guide pattern 1500 may be identified by determining the shortest distance between any two pattern elements within any of the pattern within the applicable set of patterns (e.g., such as the pattern set at FIG. 12). Using the shortest-distance as the guide pattern feature, the particular pattern element in FIG. 15 at position (row, column)=(3,5) 1506 may occupy several alternative locations without violating this shortest-distance attribute. For example, the pattern element 1506 may be placed in any of the pattern element zones 1510 at (row, column)=(2,5), (3,4), (3,5), (4,4), (4,5) or (5,5) without violating the minimum distance rule used to identify the guide pattern 1500 itself (see FIG. 16). When using this shortest distance between two pattern elements as the guide pattern it may be desirable to use of a third pattern element 1512 displaced a pre-determined distance way from a pre-determined point on a first imaginary line segment formed between the two pattern elements 1502 and 1504 to, in turn, form a second imaginary line segment between that predetermined point on the first imaginary line segment and the third pattern element 1512. These first and second imaginary line segments would provide information about the relative orientation between the tiles and the detection device 300. As would be understood from the illustrative example of FIG. 15, a pre-determined point on a first imaginary line segment formed between the two pattern elements 1502 and 1504 may be a mid-point and the second imaginary line segment between that midpoint and the third pattern element 1512 would be substantially perpendicular to the first imaginary line segment. It should also be seen from FIG. 15 that pattern element 1506 is not the same distance from any pre-determined point on the first imaginary line segment as pattern element 1512.

Because each of the six guide pattern variations 1600(a)-1600(f) shown in FIGS. 16(a)-16(f) has a unique pattern signature, each can be used to convey different information about the tile structure for a mark, both relative to the pattern of other tiles in the mark, as well as with respect to the data payload assembly for the mark. Further, each of the guide pattern variations may correspond to a distinct pattern signature calculation to use in evaluating the patterns in the mark, thus allowing for different payloads from the same mark. So once one guide pattern 1600(a)-1600(f) is identified within a mark, the signature for the particular guide pattern may be used to instruct the processor to use a particular corresponding pattern signature calculation. Where multiple guide patterns are located within an overall code or an application, this allows for multiple pattern signature calculations to be used on a mark by mark basis, thus increasing the number of possible data payloads. Further, the calculation used to determine the pattern signature of a mark may be varied on a mark by mark basis, as well as, even within the same code or the same application. For instance, rather than have the third (orientation) pattern element disposed on a second imaginary line segment perpendicular to the first imaginary line between pattern elements 1502 and 1504 another angular displacement could be used to indicate different information about the tile structure. It should also be seen from FIG. 16 that there is no position in which pattern element 1506 is the same distance from any pre-determined point on the first imaginary line segment as pattern element 1512.

Returning to the example tile structure 1402 shown in FIG. 14A, one or more of the distinct guide patterns 1600(a)-(f) may be used to assemble the data payload in various ways.

This may done, for example, by having four of the alternative guide patterns 1600(*a*)-1600(*f*) included in different tile locations of the tile structure 1402 shown in FIG. 14A. The position is a matter of design choice, and the guide patterns may be located elsewhere within the tile structure 1402.

By associating each guide pattern's signature with, for example, different pattern signature calculations or different sequences for assembling the payload for the associated mark, the coding architecture of the present invention may be far more flexible and robust than existing coding architectures. For example, for each guide pattern identified within a code or application, each mark's data payload may be assembled from pattern tile payloads in distinct and unique application selected sequences (e.g., most significant bit (MSB) to least significant bit (LSB); LSB to MSB; or some other application-specific transformed bit order).

It will be apparent to one of skill in the art having the specification and drawings before him or her that the above-described configuration is only one design choice out of many. For example, any number of the alternative guide patterns 1500(*a*)-(*f*) may be included in each code or application, and/or each such alternative guide pattern used in the code or application may be located in any number of the tile locations. In addition, or in the alternative, the aggregate bit payload of the mark may be concatenated in variable sequences, summed, multiplied or encrypted using variable keys to render the ultimately desired mark payload. In one implementation of the invention, different guide patterns may indicate a different location within the corresponding mark.

Scalable Data Payload Capacity

Because of the flexibility of the coding architecture of the present invention, a developer of any given application of the coding architecture may choose the number of unique pattern elements, patterns, and/or pattern signature calculations, the organization and structure of tiles, and the number of tiles in a mark to achieve a payload capacity appropriate for the developer's particular purposes.

Simple examples may be designed to produce large payloads, which occupy relatively little tile space or footprint. The sixteen (16) unique patterns shown and described in FIG. 12 illustrate one such example. The developer for a given application may design and select each of the 16 unique patterns shown in FIG. 12, where each pattern is selected to have 4 bits per pattern payload, where each pattern is configured in a tile structure in a 5×5 matrix of pattern element zones, where each tile is used in a tile structure configured in a 5×5 matrix of tiles (as shown in FIG. 14A at 1402) to make up a mark, and where the mark payload is assembled by single simple ordered concatenation of the pattern payloads to yield a mark payload of 96 bits (24×4 bits). In this case, pattern elements may be selected to occupy less than 10% of the available tile footprint and resulting surface area of a mark. Increasing the number of unique patterns in the pattern set to 64, but making no other changes, yields a payload of 144 bits (24×6 bits). Using a simple grid tile structure made up of a matrix of 6×6 tiles, where each tile is made up of a 5×5 matrix of pattern element zones, and 64 unique patterns yields a payload of 210 bits (35×6 bits). Compounding these variations with distinct pattern elements within patterns and in the guide pattern further scales the data payload dramatically without changing the footprint of the mark itself. If more modest payload is required, reducing the number of patterns and tiles scales back the data payload accordingly, reducing the footprint of each mark. The scalability of this method to suit the data type and capacity of specific applications with very simple parametric changes to deposition and detection methods is a significant advantage over existing marking systems.

Software Implementation

It will be understood by one of skill in the art having the present specification, drawings and claims before them that the various processing, calculations and algorithms needed to actually encode and decode the coding architecture described herein may be implemented by any known software applications. For example, the software may exist as a Java class ("OVal", or "Optical Value") with methods that encode and decode images based on the given design parameters selected for implementing the coding architecture as described. As explained, many aspects of the coding architecture may be parameterized to give a high degree of flexibility and robustness in deploying either encoding or decoding processes using software.

In an embodiment of the software, OVal may be used to encode 96 bits of binary data using twenty-four 5×5 tiles each of which encode 4 bits of data (as shown in FIG. 12). Each pattern element zone in each 5×5 tile has a physical area of 2×2 pixels, which was selected based on the printing capabilities of commonly-available home inkjet printers printing at 1200 dpi. However, the OVal field-of-view (i.e. window) captured for analysis is preferably designed to be large enough to be a multiple of the dimension of an OVal image so the system can rely on the window being large enough to always include at least one complete OVal image. In practice, the dimensions of the input image array will preferably be sensor device specific and is likely to be symmetrical and larger than two times the dimensions of the OVal image itself. In testing, we have selected OVal to be 2.5 times the size of one complete OVal image (i.e. 175×175 pixels) where the illustrative OVal image is 70×70 pixels, which reflects the sum of the dimensions of pattern tiles and the gutters between tiles that together form an encoded OVal image having 96 bits of binary data. In turn, these dimensions dovetail nicely with commonly used CMOS detectors that are 256×256 pixels.

The rendering and utilization of this bit stream is application dependent; all 96 bits may be used to represent a single integer value or they may, for instance, be parsed into application specific sub-fields for use in arbitrary application specific ways.

Example Implementation

An example implementation of the coding architecture in accordance with the invention will now be described in connection with FIGS. 17A, 17B and 18.

Figure 16:
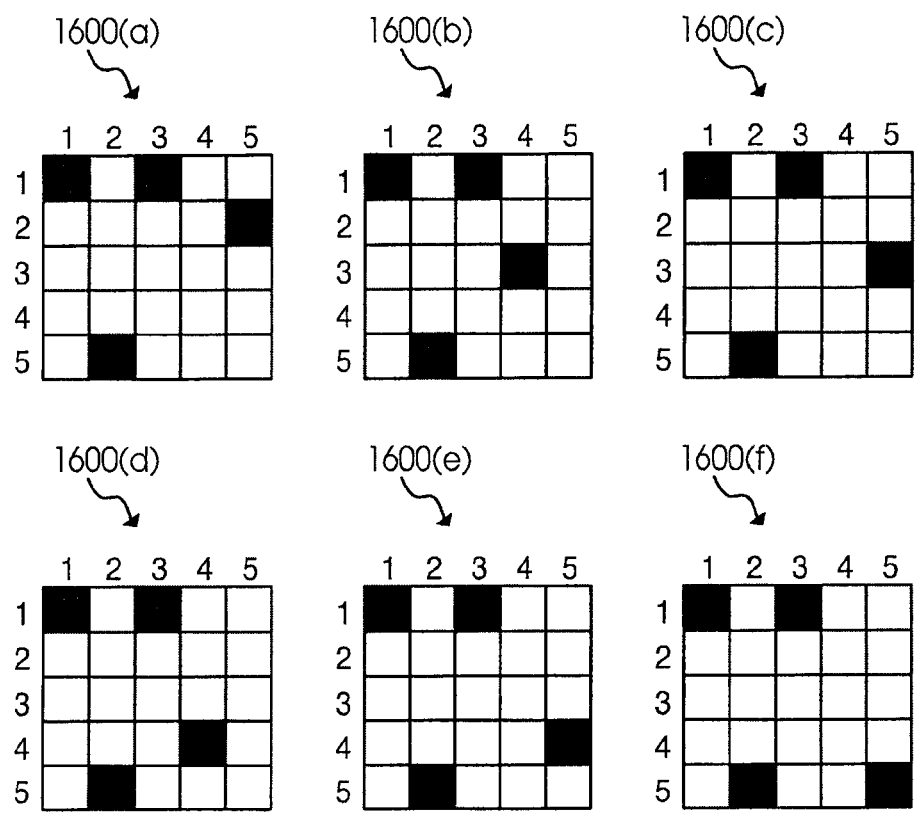
FIG. 16 illustrates various alternative guide patterns for the guide pattern in FIG. 15.
Figure 17A:
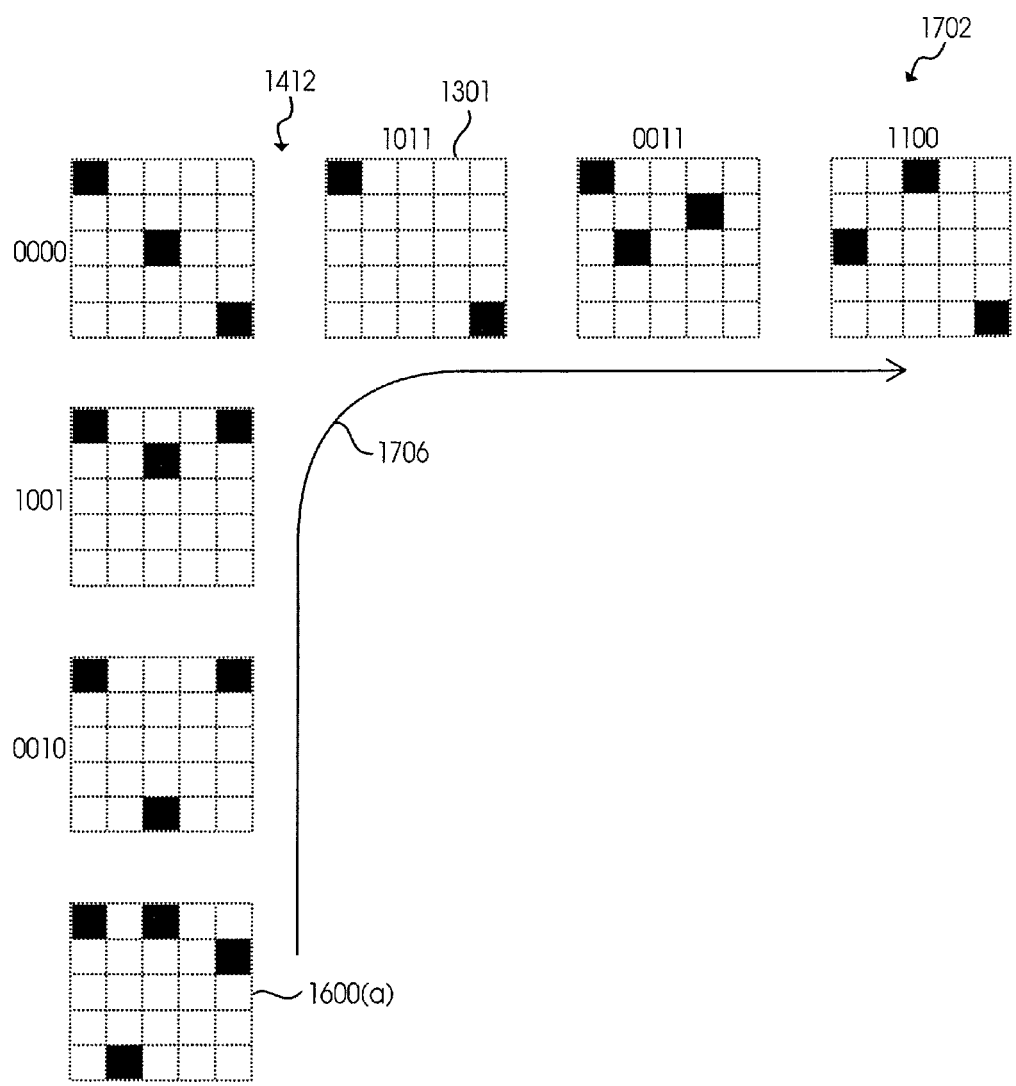
FIG. 17A illustrates an example implementation of a mark using the pattern set of FIG. 12, and having one of the alternative guide patterns shown in FIG. 16.

FIG. 17A illustrates an example implementation of a mark 1704 using the pattern set of FIG. 12, and having one of the alternative guide patterns 1600(*a*) shown in FIG. 16. In this example implementation, in order that adjacent pattern elements from adjacent tiles do not satisfy the shortest-distance attribute that is used to uniquely identify the guide patterns in this implementation, it is preferable that the gutter spaces 1412 between tiles is at least slightly wider than the width of a single zone.

As explained above, the overall payload of the mark 1702 may be determined by assembling the individual data payloads of the patterns that make up the mark 1702. In the example of FIG. 17A, the mark payload is determined by sequentially assembling the individual data payloads from the lower left to the upper right (as shown by the direction arrow 1706). It is of course understood that the assembly of individual data payloads is a matter of design choice, and a sequential assembly is not required. Assuming a lower-left to upper-right sequential assembly, the overall data payload of the mark 1702 is 00101001000010110011100. Although the guide pattern 1600(a) does not contribute any individual data payload to the mark payload, this too is a design choice, and in other implementations, the guide pattern 1600(a) may be assigned an individual data payload that contributes to the mark payload.

Figure 17B:
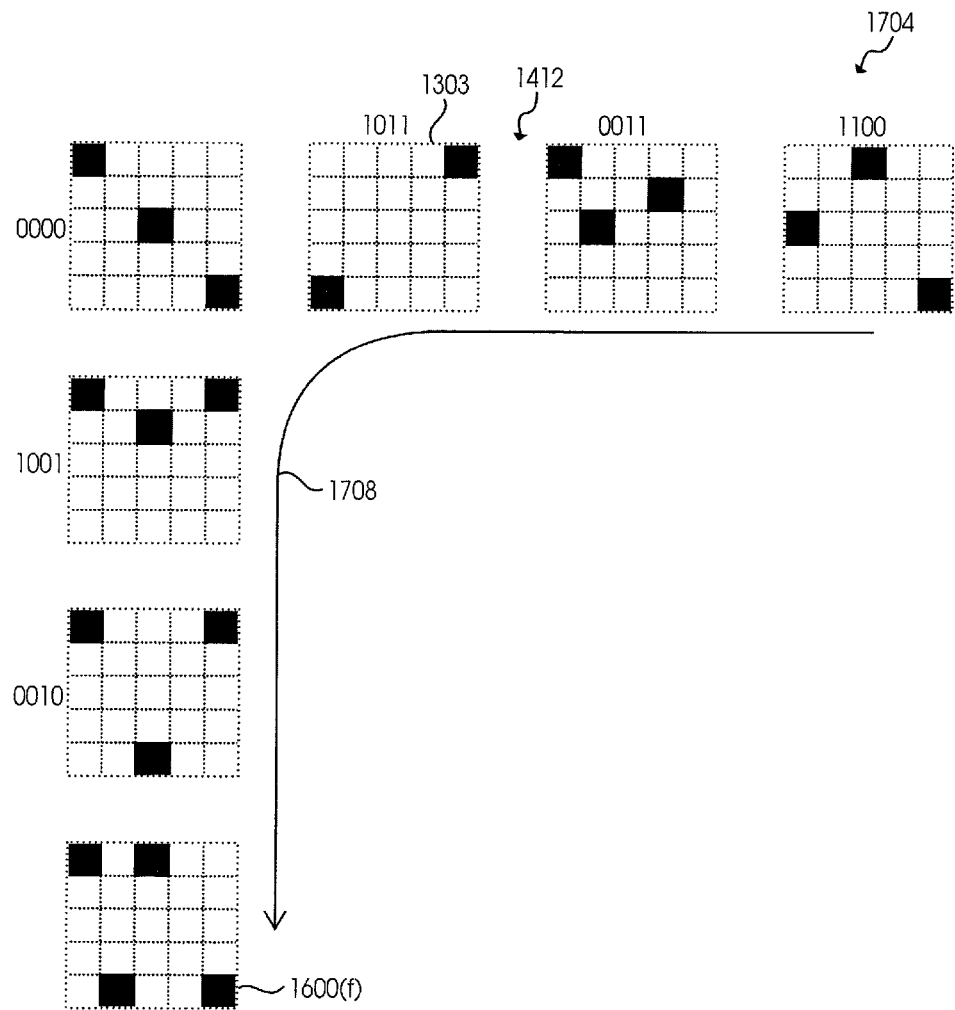
FIG. 17B illustrates another example implementation of a mark using the pattern set of FIG. 12, and having one of the alternative guide patterns shown in FIG. 16.

FIG. 17B illustrates another example implementation of a mark 1704 using the pattern set of FIG. 12, and having one of the alternative guide patterns 1600(g) shown in FIG. 16. As previously explained, where alternative guide patterns are provided in an application, the assembly of the mark payload my vary depending on the particular alternative guide pattern utilized in a particular mark. For example, while the guide pattern 1600(a) of FIG. 17A is assigned a mark assembly convention of lower-left to upper-right (as shown by 1706), the guide pattern 1600(f) of FIG. 17B may be assigned a mark assembly convention of upper-right to lower-left (as shown by the direction arrow 1708). Assuming this upper-right to lower-left sequential assembly, the overall data payload of the mark 1702 is 11000011101100010010010.

An example of use of isometric equivalent patterns is also illustrated in FIG. 17A and 17B. In particular, a first pattern 1301 having a pattern signature 11.314 is used in FIG. 17A, while an isometric equivalent pattern 1303, also having a pattern signature 11.314, is used in FIG. 17B.

Figure 18:
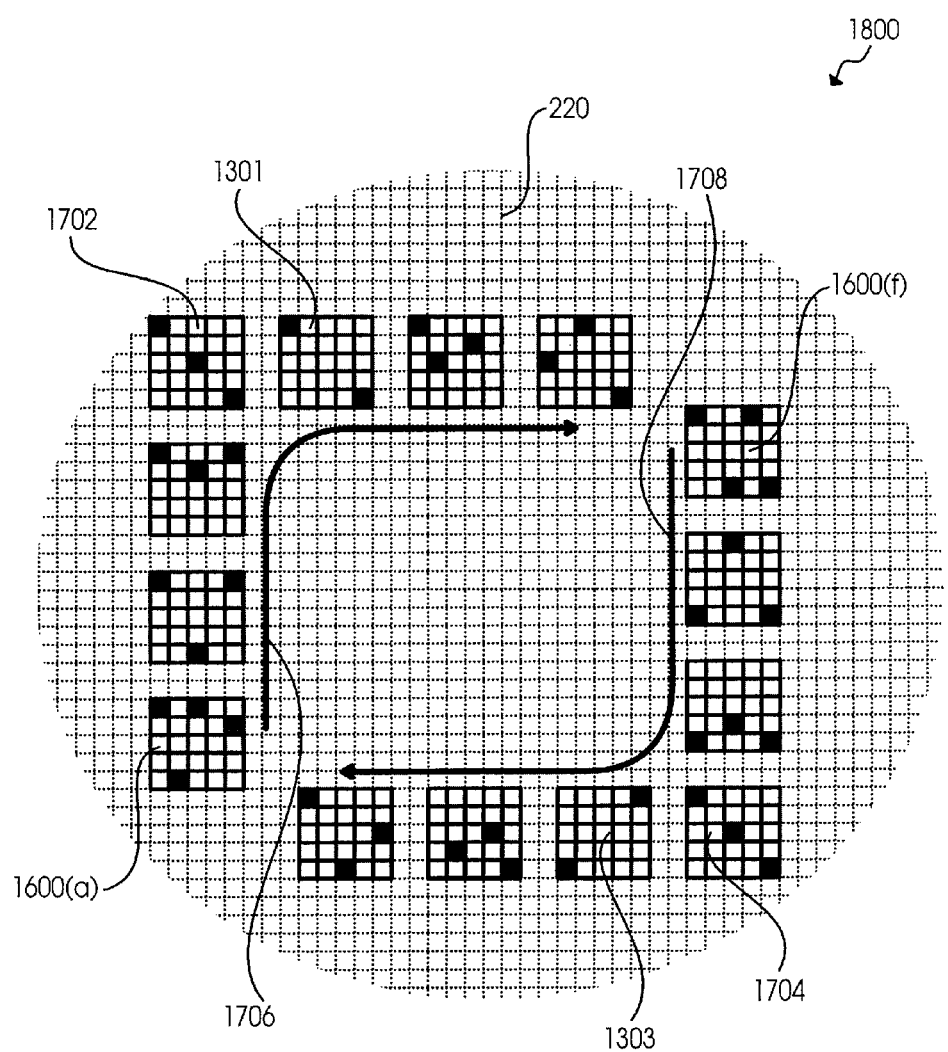
FIG. 18 illustrates a magnified view of the image captured by an optical reader in one implementation of the marks from FIGS. 17A and 17B used on a medium.

FIG. 18 illustrates a magnified view of an image captured by an optical reader in one implementation of the invention. Two marks 1702 (from FIG. 17A) and 1704 (from FIG. 17B) are shown the image capture window 1800 of FIG. 18. As explained above, the guide pattern 1600(a) may be assigned the assembly convention of lower-left to upper-right, while the guide pattern 1600(f) may be assigned the assembly convention of upper-right to lower-left. Although the data payloads for the marks 1702 and 1704 respectively were different using these assigned assembly conventions when discussed above with respect to FIGS. 17A and 17B, in FIG. 18, because the mark 1704 is place upside-down on the medium, the resulting data payloads are equal.

Having now fully described the invention, it will be understood by those of ordinary skill in the art that the invention may be performed within a wide and equivalent range of conditions, formulations and other parameters without affecting the scope of the invention or any embodiment thereof. For example, as described, the number of unique patterns possible may be increased by using two or more distinct pattern elements (in lieu of the uniform pattern elements shown in the foregoing examples), without any other change in the pattern or its footprint. As also described herein, other physical attributes may be incorporated in the coding architecture of the invention, including, by way of example only, chromaticity, voltage, RF, mass, and magnetism. In addition, the coding architecture in accordance with the invention may be used to encode in or on any applicable or appropriate source, medium or surface. For instance, while optical print-based codes may be encoded on a paper medium, audio-based codes may be encoded in a sound signal, and light-based codes may be encoded in a light signal. All patents, patent applications, and publications cited herein are fully incorporated by reference in their entirety.

What is claimed is:

1. A handheld device comprising:
a housing;
a detection device enclosed in the housing and configured to capture a mark, wherein the mark is a code physically associated with a source, said code comprising one or more patterns including a guide pattern arranged in a mark, wherein each pattern includes one or more pattern elements arranged in pattern element zones, each respective pattern of the one or more patterns having a pattern signature based on a predetermined physical attribute corresponding to the one or more pattern elements within the respective pattern, wherein the guide pattern has a guide pattern feature that is predetermined circumference of a pattern element; and
a controller operably coupled to the detection device and configured to generate physical attribute data associated with the captured mark, receive the physical attribute data, and determine the one or more pattern signatures in the mark by performing an arithmetic calculation on the physical attribute data.

2. The handheld device of claim 1 wherein the housing has a pen-like shape.

3. The handheld device of claim 2, further comprising an audio speaker operably coupled to the controller.

4. The handheld device of claim 3 wherein the audio speaker is enclosed in the housing.

5. The handheld device of claim 4 wherein the guide pattern has a first guide pattern signature, and the controller identifies the guide pattern based on the guide pattern feature.

6. The handheld device of claim 5 wherein the guide pattern feature further comprises at least one of a predetermined distance between two pattern elements, a predetermined area of a pattern element, a predetermined volume of a pattern element, and a predetermined diameter of a pattern element.

7. The handheld device of claim 6 wherein the detection device is an optical reader having an optical sensor.

8. The handheld device of claim 7 wherein the source is selected from the group consisting of a paper medium photograph, and an identification card.

9. The handheld device of claim 8, further comprising a visual display means operably coupled to the controller.

10. The handheld device of claim 9 wherein the visual display means is enclosed in the housing.

11. A handheld device comprising
a housing;
a detection device enclosed in the housing and configured to capture a mark, wherein the mark is a code physically associated with a source, said code comprising one or more patterns including a guide pattern arranged in a mark, wherein each pattern includes one or more pattern elements arranged in pattern element zones, each respective pattern of the one or more patterns having a pattern signature based on a predetermined physical attribute corresponding to the one or more pattern elements within the respective pattern, wherein the guide pattern has a guide pattern feature that is a predetermined circumference of a pattern element;
a controller operably coupled to the detection device and configured to generate physical attribute data associated with the captured mark, receive the physical attribute data, and determine the one or more pattern signatures in the mark by performing an arithmetic calculation on the physical attribute data; and
a visual display means operably coupled to the controller.

12. The handheld device of claim 11 wherein the visual display means is enclosed in the housing.

13. The handheld device of claim 12 wherein the housing has a pen-like shape.

14. The handheld device of claim 13 wherein the guide pattern has a first guide pattern signature, and the controller identifies the guide pattern based on the guide pattern feature.

15. The handheld device of claim 14 wherein the guide pattern feature further comprises at least one of a predetermined distance between two pattern elements, a predetermined area of a pattern element, a predetermined volume of a pattern element, and a predetermined diameter of a pattern element.

16. The handheld device of claim 15 wherein the detection device is an optical reader having an optical sensor.

17. The handheld device of claim 16 wherein the source is selected from the group consisting of a paper medium, a photograph, and an identification card.

* * * * *